(12) United States Patent
Morooka et al.

(10) Patent No.: US 8,654,448 B2
(45) Date of Patent: Feb. 18, 2014

(54) INNER FOCUS LENS SYSTEM AND IMAGE PICKUP APPARATUS USING THE SAME

(71) Applicant: Olympus Imaging Corp., Tokyo (JP)

(72) Inventors: Masaru Morooka, Tokyo (JP); Akiyoshi Tochigi, Tokyo (JP); Yasuharu Yamada, Tokyo (JP); Yasuji Ogata, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 13/705,875

(22) Filed: Dec. 5, 2012

(65) Prior Publication Data

US 2013/0162886 A1 Jun. 27, 2013

(30) Foreign Application Priority Data

Dec. 15, 2011 (JP) ................................. 2011-274996

(51) Int. Cl.
*G02B 15/14* (2006.01)
(52) U.S. Cl.
USPC ........... 359/684; 359/676; 359/683; 359/689; 359/716; 359/740; 359/784
(58) Field of Classification Search
USPC .......... 359/676, 683, 674, 689, 716, 740, 784
See application file for complete search history.

(56) References Cited

U.S. PATENT DOCUMENTS

| | | | |
|---|---|---|---|
| 5,715,097 A * | 2/1998 | Shibayama et al. | 359/684 |
| 5,719,703 A * | 2/1998 | Sato | 359/684 |
| 6,441,967 B2 * | 8/2002 | Furuta | 359/684 |
| 6,865,031 B2 | 3/2005 | Hoshi | |
| 6,912,095 B2 * | 6/2005 | Yamada | 359/689 |
| 6,927,926 B2 * | 8/2005 | Kasahara et al. | 359/684 |
| 7,177,100 B2 * | 2/2007 | Tomioka | 359/784 |
| 7,903,348 B2 | 3/2011 | Sensui | |
| 7,940,478 B2 | 5/2011 | Take | |
| 8,027,100 B2 | 9/2011 | Take | |
| 2001/0028511 A1 * | 10/2001 | Sensui | 359/689 |
| 2004/0156121 A1 * | 8/2004 | Ori et al. | 359/689 |
| 2005/0286140 A1 * | 12/2005 | Tomioka | 359/689 |
| 2011/0141583 A1 | 6/2011 | Take | |
| 2011/0170202 A1 * | 7/2011 | Tomioka | 359/684 |

FOREIGN PATENT DOCUMENTS

| | | |
|---|---|---|
| JP | 2003-241084 | 8/2003 |
| JP | 2009-237542 | 10/2009 |
| JP | 2009-258157 | 11/2009 |
| JP | 2010-066432 | 3/2010 |

* cited by examiner

*Primary Examiner* — Evelyn A. Lester
(74) *Attorney, Agent, or Firm* — Kenyon & Kenyon LLP

(57) ABSTRACT

An inner focus lens system includes from the object side, a first lens unit having a positive refractive power, an aperture stop, a second lens unit having a positive refractive power, and a third lens unit. The first lens unit includes a plurality of negative lenses and at least one positive lens, the lens located closest to the object side is a negative lens. The second lens unit includes at least one negative lens and at least one positive lens, and moves toward the object side for focusing from an infinite object distance to a close object distance such that the distance between the second lens unit and the aperture stop decreases and that the distance between the second lens unit and the third lens unit increases. The lens system satisfies the following conditions: $1 < f_1/f\,14$ (1), and $0.8 < f_{23}/f_2 < 3$ (2).

16 Claims, 17 Drawing Sheets

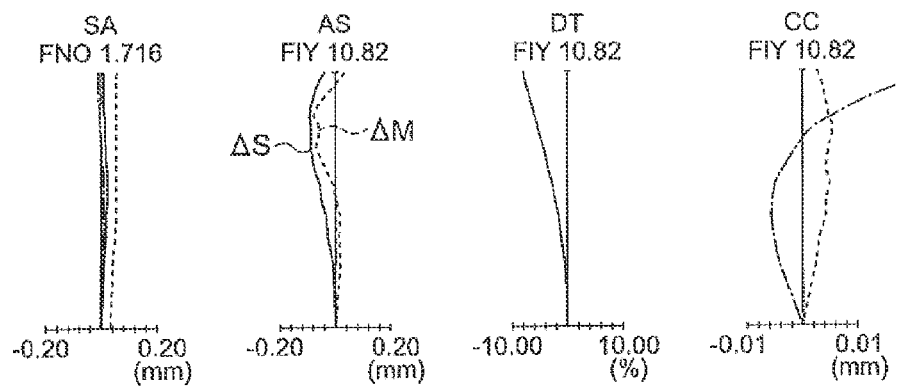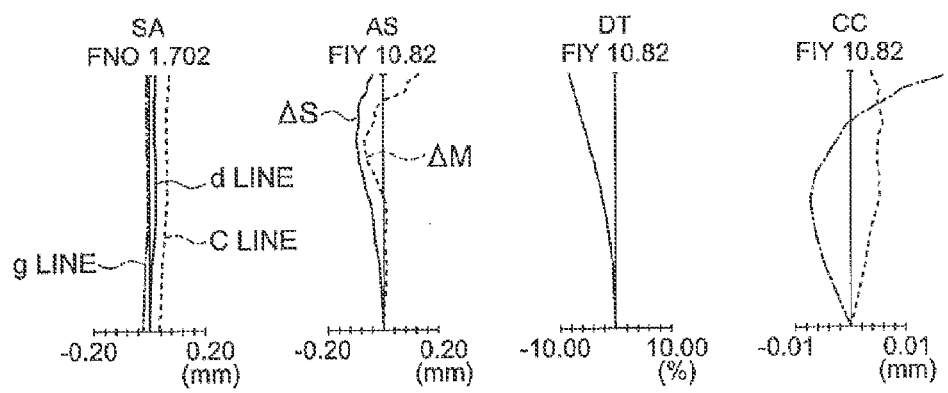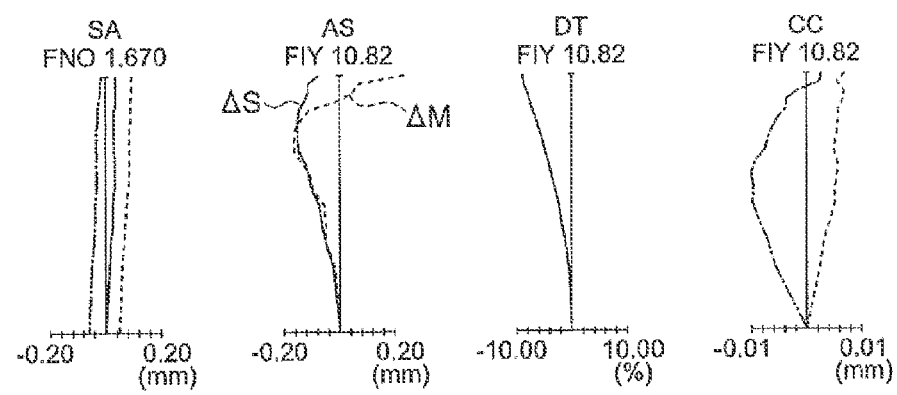

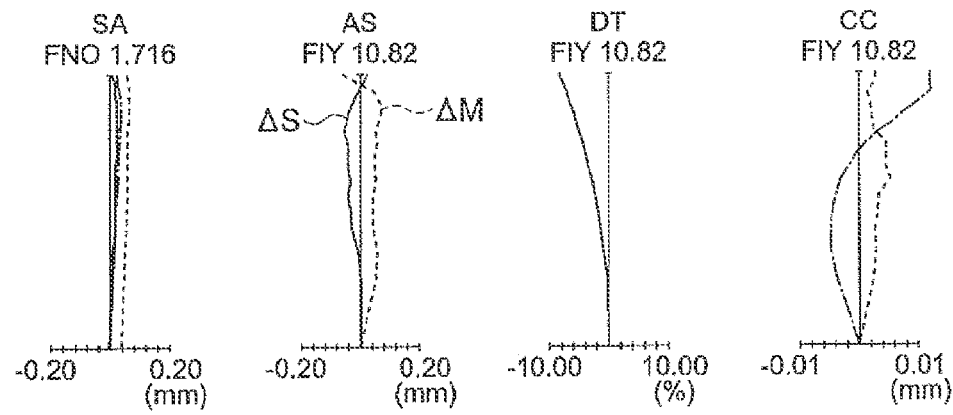
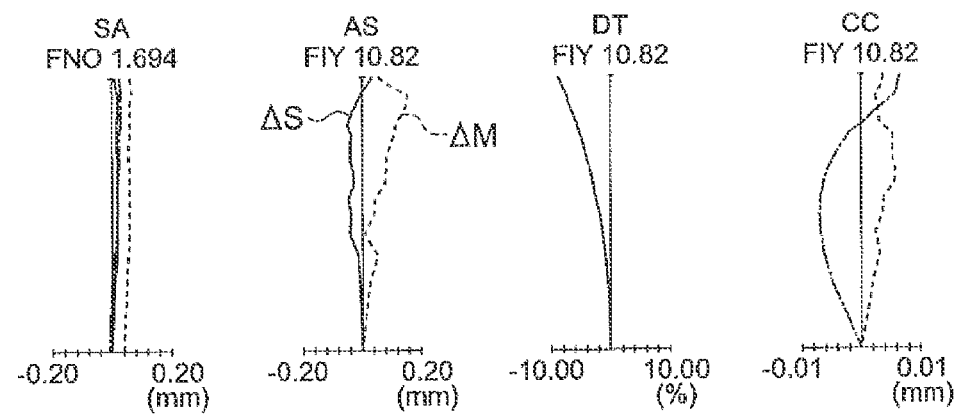
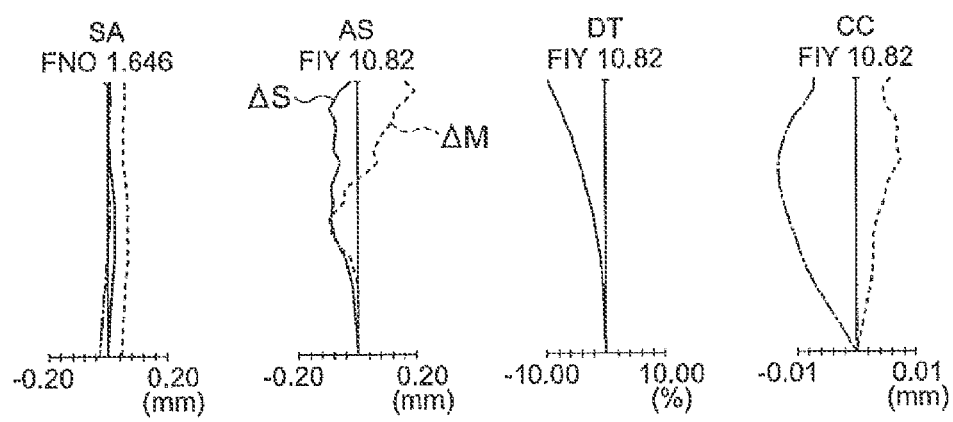

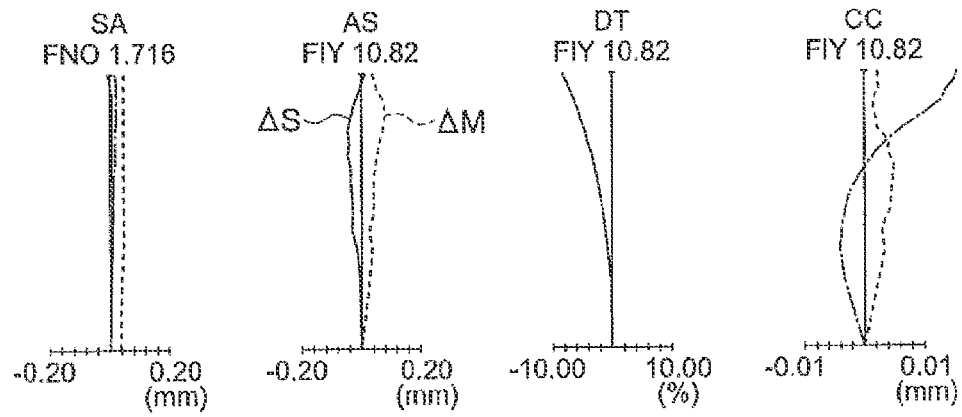
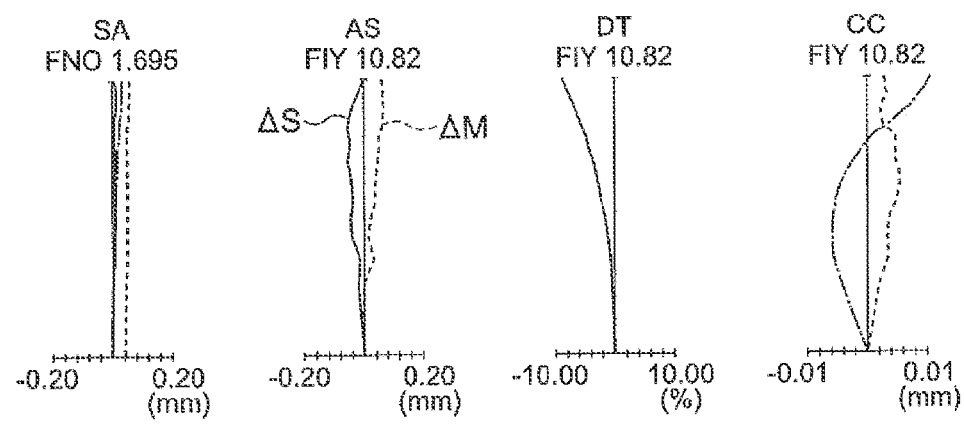
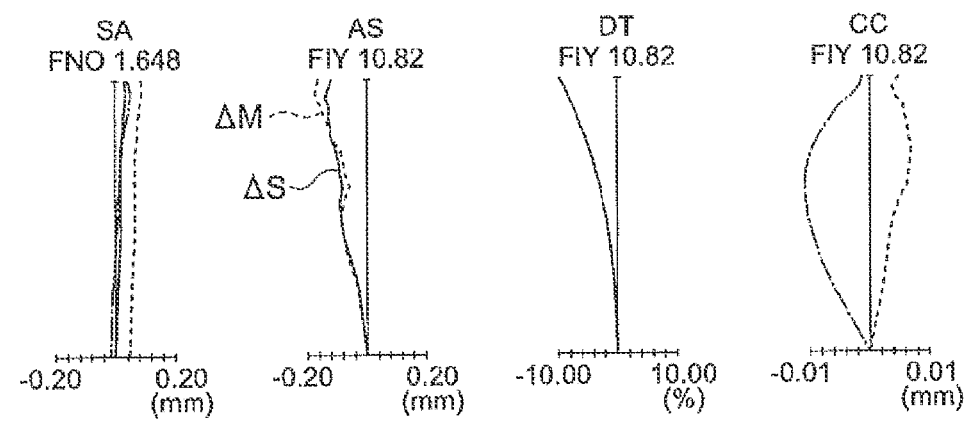

SA
FNO 1.716

AS
FIY 10.82

DT
FIY 10.82

CC
FIY 10.82

SA
FNO 1.701

AS
FIY 10.82

DT
FIY 10.82

CC
FIY 10.82

SA
FNO 1.667

AS
FIY 10.82

DT
FIY 10.82

CC
FIY 10.82

435.84 —·—·—
656.27 - - - - - -
587.56 ———

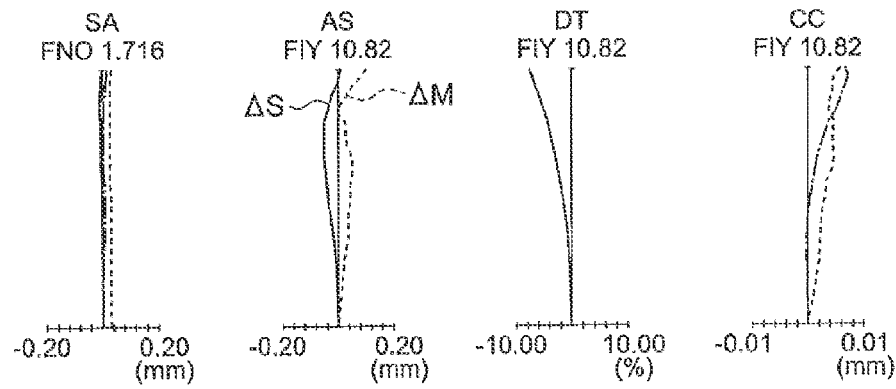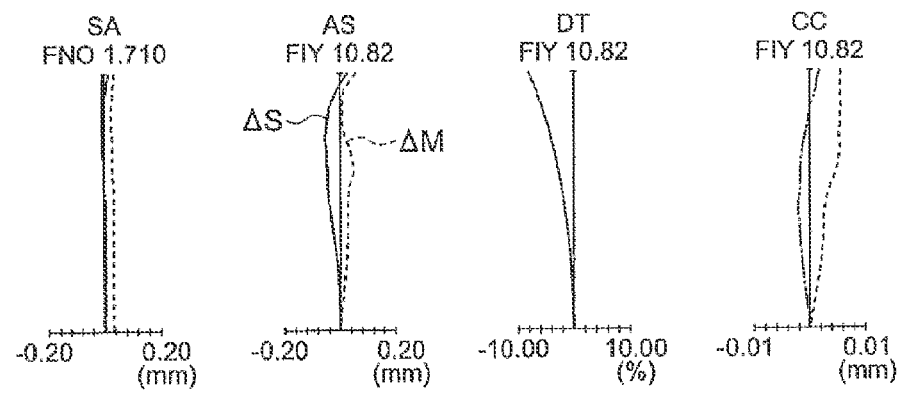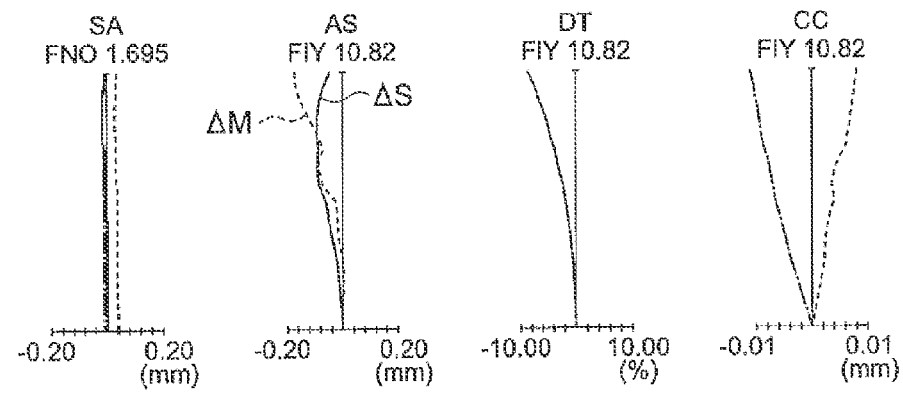

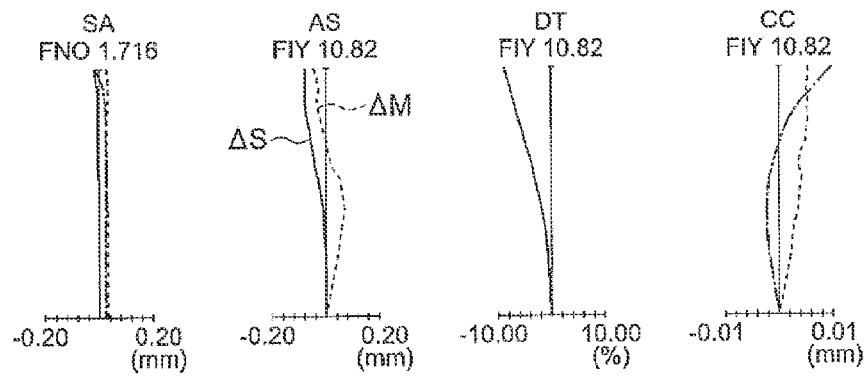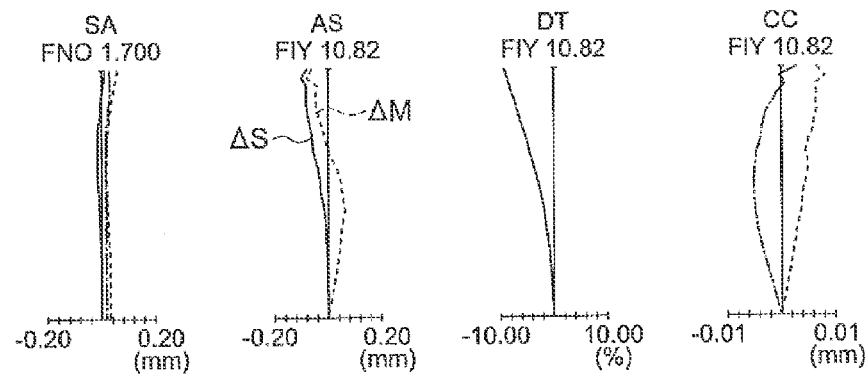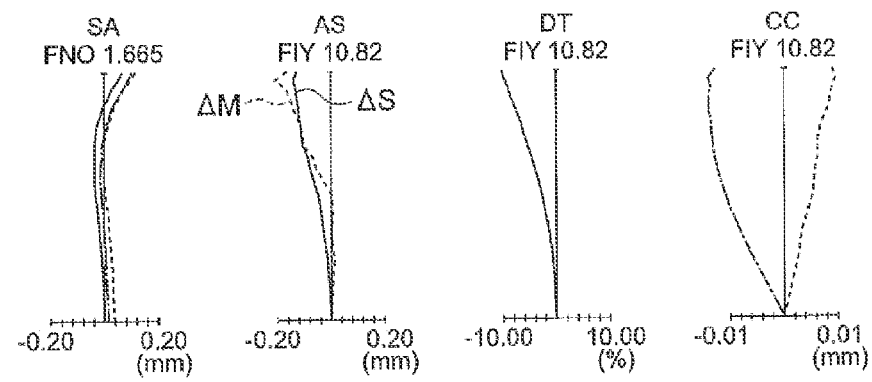

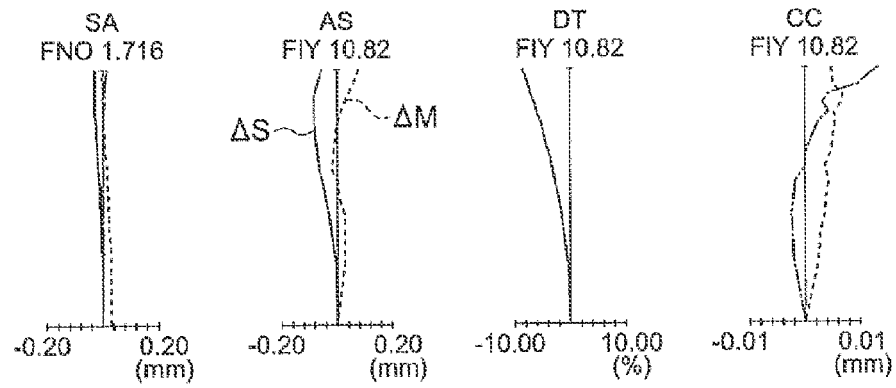
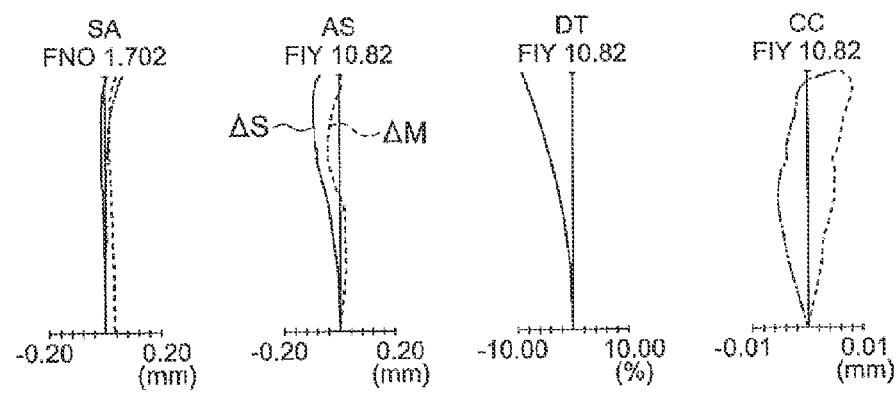
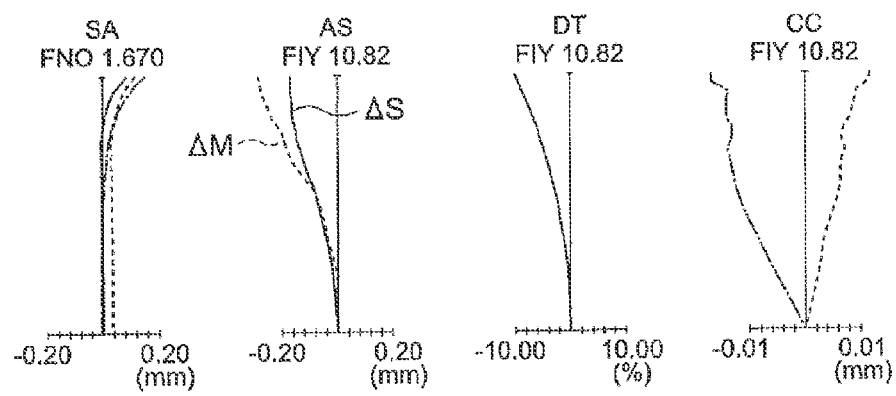

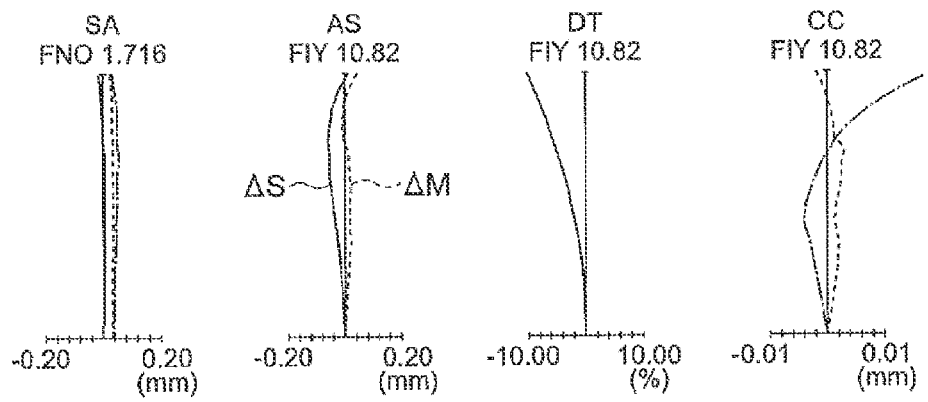
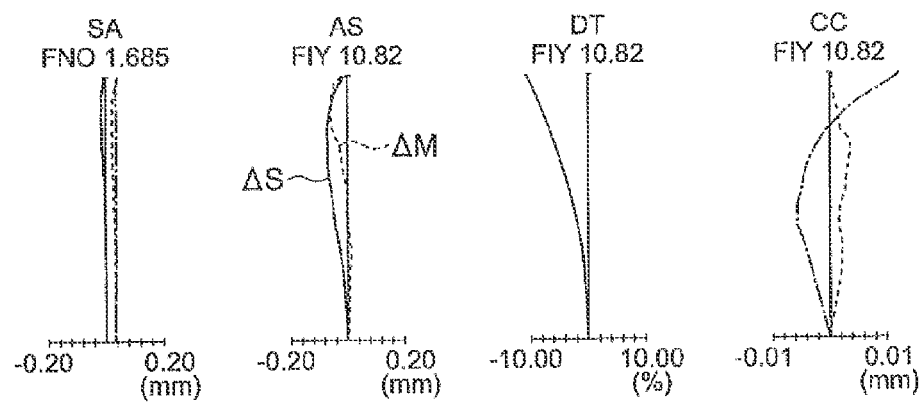
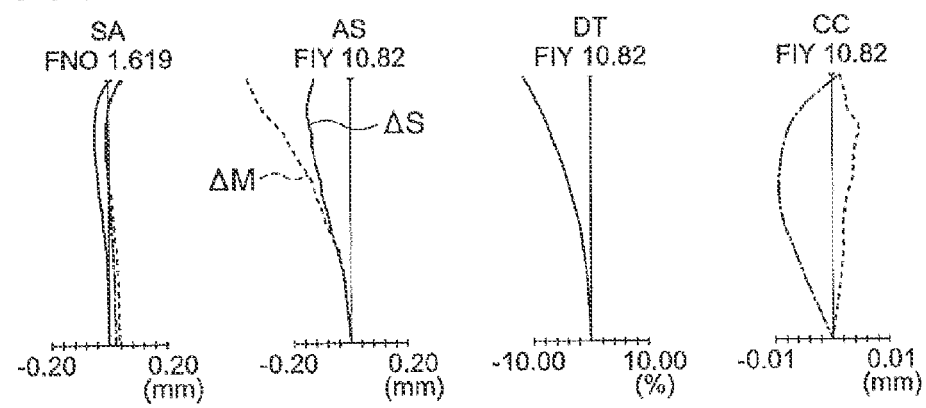

INNER FOCUS LENS SYSTEM AND IMAGE PICKUP APPARATUS USING THE SAME

CROSS-REFERENCE TO RELATED APPLICATION

The present application is based upon and claims the benefit of priority from the prior Japanese Patent Application No. 2011-274996 filed on Dec. 15, 2011; the entire contents of which are incorporated herein by reference.

BACKGROUND OF THE INVENTION

1. Field of the Invention

The present invention relates to an inner focus lens system and an image pickup apparatus using the same.

2. Description of the Related Art

Wide angle lenses of what is called a Gauss type configuration have been known as wide angle lenses for use in photographic cameras and still video cameras. The Gauss type lens system refers to a lens system having a substantially symmetric refractive power arrangement on both sides of an aperture stop. Japanese Patent Application Laid-Open No. 2003-241084 and Japanese Patent Application Laid-Open No. 2009-258157 describe Gauss type lens systems. The lens systems described in Japanese Patent Application Laid-Open No. 2003-241084 and Japanese Patent Application Laid-Open No. 2009-258157 are wide angle lenses having an F-number of approximately 2.8.

A lens system described in Japanese Patent Application Laid-Open No. 2009-237542 is a similar Gauss type lens system. The lens system described in Japanese Patent Application Laid-Open No. 2009-237542 is a standard lens having a large diameter (with an F-number of approximately 1.8). A lens system described in Japanese Patent Application Laid-Open No. 2010-66432 has a still larger diameter (with an F-number of approximately 1.4).

In the Gauss type lens systems described in the above-mentioned publications, a lens unit having a positive refractive power is arranged on the image side of the aperture stop, and this lens unit having a positive refractive power is advanced (namely, moved toward the object side) in its entirety. Thus, the Gauss type lens systems described in the above-mentioned publications are what is called rear focus lens systems.

SUMMARY OF THE INVENTION

An inner focus lens system according to the present invention comprising, in order from an object side to an image side:
a first lens unit having a positive refractive power;
an aperture stop;
a second lens unit having a positive refractive power; and
a third lens unit, wherein
the total number of lens units in the inner focus lens system is three, the three lens units including the first lens unit, the second lens unit, and the third lens unit,
the first lens unit comprises a plurality of negative lenses and at least one positive lens, the lens located closest to the object side in the first lens unit being one negative lens among the plurality of negative lenses,
the second lens unit includes at least one negative lens and at least one positive lens,
for focusing from an infinite object distance to a close object distance, the second lens unit moves toward the object side in such a way that the distance between the second lens unit and the aperture stop decreases and that the distance between the second lens unit and the third lens unit increases, and the lens system satisfies the following conditional expressions (1) and (2):

$$1 < f_1/f < 14 \quad (1),$$

and $$0.8 < f_{23}/f_2 < 3 \quad (2),$$

where
$f_1$ is the focal length of the first lens unit,
f is the focal length of the entire inner focus lens system in the state in which the inner focus lens system is focused on an object point at infinity,
$f_{23}$ is the composite focal length of the second lens unit and the third lens unit in the state in which the lens system is focused on an object at infinity, and
$f_2$ is the focal length of the second lens unit.

An image pickup apparatus according to the present invention comprises:
an inner focus lens system; and
an image pickup element that is disposed on the image side of the inner focus lens system and converts an image formed by the inner focus lens system into an electrical signal.

BRIEF DESCRIPTION OF THE DRAWINGS

FIGS. 5A, 5B, 5C, 5D, 5E, 5F, 5G, 5H, 5I, 5J, 5K, and 5L are aberration diagrams of the inner focus lens system according to the first example in three different focus states;

FIGS. 6A, 6B, 6C, 6D, 6E, 6F, 6G, 6H, 6I, 6J, 6K, and 6L are aberration diagrams of the inner focus lens system according to the second example in three different focus states;

FIGS. 7A, 7B, 7C, 7D, 7E, 7F, 7G, 7H, 7I, 7J, 7K, and 7L are aberration diagrams of the inner focus lens system according to the third example in three different focus states;

FIGS. 9A, 9B, 9C, 9D, 9E, 9F, 9G, 9H, 9I, 9J, 9K, and 9L are aberration diagrams of the inner focus lens system according to the fifth example in three different focus states;

FIGS. 10A, 10B, 10C, 10D, 10E, 10F, 10G, 10H, 10I, 10J, 10K, and 10L are aberration diagrams of the inner focus lens system according to the sixth example in three different focus states;

FIGS. 11A, 11B, 11C, 11D, 11E, 11F, 11G, 11H, 11I, 11J, 11K, and 11L are aberration diagrams of the inner focus lens system according to the seventh example in three different focus states;

FIGS. 12A, 12B, 12C, 12D, 12E, 12F, 12G, 12H, 12I, 12J, 12K, and 12L are aberration diagrams of the inner focus lens system according to the eighth example in three different focus states;

DETAILED DESCRIPTION OF THE INVENTION

Figure 1A:
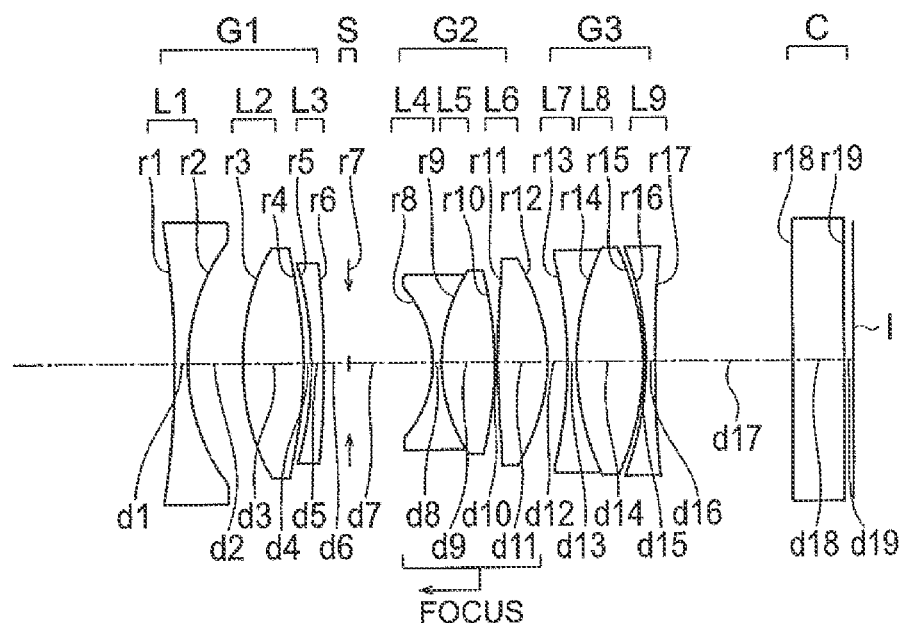
FIG. 1A is a cross sectional view of an inner focus lens system according to a first example of the present invention in the state in which the lens system is focused on an object at infinity.

In the following, some embodiments and examples of the zoom lens and image pickup apparatus according to the present invention will be described in detail with reference to the drawings. It should be understood that the present invention is not limited by the embodiments and examples described in the following.

An inner focus lens system according to one embodiment comprises, in order from the object side to the image side, a first lens unit having a positive refractive power, an aperture stop, a second lens unit having a positive refractive power, and a third lens unit, wherein the first lens unit includes a plurality of negative lenses and at least one positive lens, the lens located closest to the object side in the first lens unit is one negative lens among the plurality of negative lenses, the second lens unit includes at least one negative lens and at least one positive lens, the second lens unit moves toward the object side for focusing from an infinite object distance to a close object distance in such a way that the distance between the second lens unit and the aperture stop decreases and that the distance between the second lens unit and the third lens unit increases, and the lens system satisfies the following conditional expressions (1) and (2):

$$1 < f_1/f14 \quad (1),$$

and $$0.8 < f_{23}/f_2 < 3 \quad (2),$$

where $f_1$ is the focal length of the first lens unit, $f$ is the focal length of the entire inner focus lens system in the state in which the inner focus lens system is focused on an object point at infinity, $f_{23}$ is the composite focal length of the second lens unit and the third lens unit in the state in which the lens system is focused on an object at infinity, and $f_2$ is the focal length of the second lens unit.

The retro focus lens system is a lens system having a lens unit having a negative refractive power arranged closer to the object side than an aperture stop and a lens unit having a positive refractive power arranged closer to the image side than the aperture stop. In contrast to this, in the inner focus lens system according to this embodiment, which is different from the retro focus lens systems, the first lens unit arranged closer to the object side than the aperture stop has a positive refractive power.

With the positive refractive power of the first lens unit, the ray height can be made low in the region on the image side of the aperture stop. The second lens unit is arranged in the region on the image side of the aperture stop. Therefore, the lens diameter in the second lens unit can be made small.

As above, the lens system design with the first lens unit having a positive refractive power is advantageous for reduction in the size of the second lens unit. Moreover, the lens system design with the first lens unit having a positive refractive power is advantageous for speedup of the focusing drive, since the weight of the second lens unit can be decreased.

Lens systems having a large diameter tend to suffer from large aberration variation caused with movement of the second lens unit for focusing. In particular, variation of spherical aberration and curvature of field upon focusing onto an object at close distance tends to become large. To correct (or reduce) such aberration variation, it is preferred that the refractive power of the second lens unit be somewhat low.

However, a small refractive power of the second lens unit necessitates a large focus driving amount (i.e. the amount of movement of the second lens unit) for focusing from an infinite object distance to a close object distance. Moreover, it is necessary that the position of the second lens unit in the state in which the lens system is focused on an object at infinity be distant from the aperture stop. At such a position, however, the ray height of off-axis rays is high, necessitating a large lens diameter in the second lens unit. Thus, if the refractive power of the second lens unit is made low, it is difficult to make the size of the second lens unit small.

In view of the above, in the inner focus lens system according to this embodiment, the third lens unit is provided on the image side of the second lens unit. In addition, the lens system is designed in such a way that the distance between the second lens unit and the third lens unit changes during the focusing operation. More specifically, for focusing from an infinite object distance to a close object distance, the second lens unit moves toward the object side in such a way that the distance between the second lens unit and the aperture stop decreases and that the distance between the second lens unit and the third lens unit increases.

With the provision of the third lens unit, the third lens unit can contribute to correction of aberration variation upon focusing onto an object at a close distance. Moreover, with the provision of the third lens unit, it is not necessary to make the refractive power of the second lens unit low. Therefore, the amount of movement of the second lens unit for focusing can be made small. In consequence, a small size and a large diameter can both be achieved in the lens system, and the increase in the size of the lens system, which can be necessitated when the lens system has a wide angle of view, can be made small.

As described above, it is preferred that the total number of lens units in the inner focus lens system be three, the three lens units including a first lens unit, a second lens unit, and a third lens unit.

Increases in the diameter and the angle of view of the lens system lead to generation of spherical aberration and sagittal coma flare. In particular, since the refractive power of the first lens unit is positive, if the first lens unit is composed only of one negative lens and one positive lens, the refractive power of the positive lens must be relatively high. Then, a large amount of spherical aberration will be generated if the lens system has a large diameter and a wide angle of view, and a large amount of sagittal coma flare will be generated if the lens system has a wide angle of view. Therefore, it is difficult to correct these aberrations in the first lens unit including only one negative lens and one positive lens.

In the inner focus lens system according to this embodiment, the first lens unit includes a plurality of negative lenses and at least one positive lens, and the lens located closest to the object side in the first lens unit is one of the plurality of negative lenses.

Having a plurality of negative lenses or at least two negative lenses in the first lens unit allows good correction of spherical aberration and sagittal coma flare generated by the positive lens. Moreover, since the lens located closest to the object side is a negative lens, an appropriate back focus can be provided even if the lens system has a large wide angle of view. In consequence, a large diameter and a wide angle of view can be achieved in the lens system.

In addition, in the inner focus lens system according to this embodiment, the second lens unit includes at least one negative lens and at least one positive lens.

Having at least one negative lens and at least one positive lens in the second lens unit is desirable for achieving good correction of spherical aberration and chromatic aberration and for reducing aberration variation during the focusing operation.

It is also preferred that the inner focus lens system according to this embodiment satisfy the following conditional expressions (1) and (2):

$$1<f_1/f<14 \tag{1},$$

and $$0.8<f_{23}/f_2<3 \tag{2},$$

where $f_1$ is the focal length of the first lens unit, f is the focal length of the entire inner focus lens system in the state in which the inner focus lens system is focused on an object point at infinity, $f_{23}$ is the composite focal length of the second lens unit and the third lens unit in the state in which the lens system is focused on an object at infinity, and $f_2$ is the focal length of the second lens unit.

Conditional expression (1) limits the focal length of the first lens unit appropriately, thereby allows to make the lens system small and to make aberration variation upon focusing onto an object at a close distance small.

If the lower limit of conditional expression (1) is not reached, the focal length of the first lens unit is too short. Then, the second and subsequent lens units (the lens units arranged on the image side of the aperture stop as a whole) will be necessitated to have a relatively high lateral magnification. In consequence, aberration of the first lens unit will tend to be magnified by the second and subsequent lens units, leading to large aberration variation upon focusing onto an object at a close distance, in particular large variation in spherical aberration and coma. For this reason, it is undesirably that the lower limit of conditional expression (1) is not reached.

If the upper limit of conditional expression (1) is exceeded, the focal length of the first lens unit is too long. Then, the diameter of axial beams incident on the second lens unit will become large. In consequence, the lens diameter in the second lens unit will be necessitated to be large, making it difficult to make the second lens unit small. Therefore, it is disadvantageous for size reduction of the second lens unit that the upper limit of conditional expression (1) is exceeded.

Conditional expression (2) limits the composite focal length of the second lens unit and the third lens unit appropriately, thereby favorably reducing aberration variation upon focusing onto an object at a close distance and aberrations generated in the entire lens system.

If the lower limit of conditional expression (2) is not reached, the focal length of the second lens unit is too long. Then, the amount of movement of the second lens unit upon focusing onto an object at a close distance will be necessitated to be large. For this reason, it is disadvantageous for size reduction of the lens system that the lower limit of conditional expression (2) is not reached. Moreover, if the lower limit of conditional expression (2) is not reached, the Petzval sum will become large, making correction curvature of field and chromatic aberration difficult. Therefore, it is undesirable that the lower limit of conditional expression (2) be not reached.

If the upper limit of conditional expression (2) is exceeded, the focal length of the second lens unit is too short. Then, it will be difficult to provide an appropriately long back focus. In addition, correction of spherical aberration and coma in the entire lens system and correction of spherical aberration and coma upon focusing onto an object at a close distance will become difficult. Therefore, it is undesirable that the upper limit of conditional expression (2) be exceeded.

In the inner focus lens system according to this embodiment, it is preferred that the first lens unit include at least four lenses.

Having at least four lenses in the first lens unit enables good correction of aberrations generated in the first and in the entire lens system.

It is preferred that the inner focus lens system according to this embodiment satisfy the following conditional expression (3):

$$2<TL/f<4 \tag{3},$$

where TL is the sum of the distance on the optical axis from the lens surface closest to the object side to the lens surface closest to the image side of the inner focus lens system and the back focus, f is the focal length of the entire inner focus lens system in the state in which the inner focus lens system is focused on an object at infinity.

By limiting the overall length of the inner focus lens system appropriately by conditional expression (3), smallness and high performance of the lens system can both be achieved. The distance on the optical axis from the lens surface closest to the object side to the lens surface closest to the image side is not an equivalent air distance but the actual distance, and the back focus is an equivalent air distance.

If the lower limit of conditional expression (3) is reached, the respective refractive powers of the first to third lens units can be made appropriately low. In consequence, correction of aberrations can be achieved in each of the lens units while preventing or reducing an increase in the number of lenses and the number of aspheric surfaces. Preventing or reducing an increase in the number of lenses and the number of aspheric surfaces also leads to reduction in the cost of the lens system. Furthermore, since the refractive powers of the lens units can be made low, each lens unit will less affect decentering aberrations (namely, the sensitivity to decentering aberrations can be made lower in each lens unit).

If the upper limit of conditional expression (3) is not exceeded, the amount of movement of the second lens unit for focusing can be made small. In addition, an increase in the back focus can be prevented. Therefore, it is advantageous for size reduction of the lens system that the upper limit of conditional expression (3) is not exceeded.

It is preferred that the inner focus lens system according to this embodiment satisfy the following conditional expression (2'):

$$1 < f_{23}/f_2 < 3 \qquad (2'),$$

where $f_{23}$ is the composite focal length of the second lens unit and the third lens unit in the state in which the lens system is focused on an object at infinity, and $f_2$ is the focal length of the second lens unit.

Technical meaning of conditional expression (2') is the same as conditional expression (2).

In the inner focus lens system according to this embodiment, it is preferred that the first lens unit include a cemented lens made up of a negative lens and a positive lens cemented together arranged closer to the image side than the negative lens closest to the object side and that the first lens unit includes four lenses.

If the first lens unit has a cemented lens made up of a negative lens and a positive lens in addition to the negative lens closest to the object side, good correction of chromatic aberration can be achieved. Moreover, having four lenses in the first lens unit allows good correction of aberrations of the first lens unit and the lens system as a whole.

In the inner focus lens system according to this embodiment, it is preferred that the second lens unit include, in order from the object side, a negative lens, a positive lens, and a positive lens.

If the second lens unit includes, in order from the object side, a negative lens and a positive lens, the second lens unit includes a retro focus type lens configuration. Consequently, the position of the principal point of the second lens unit can be made closer to the image side. Furthermore, the ray height of off-axis rays in the third lens unit can be made low by providing a sufficiently large back focus.

Moreover, having the image side positive lens, the second lens unit includes two positive lenses. Therefore, the refractive power can be distributed to the two positive lenses. This allows good correction of aberrations in the second lens unit and reduction of decentering sensitivity of each of the negative lens and the two positive lenses. Having two positive lenses is also advantageous for size reduction of the lens system, because the second lens unit can easily have high refractive power by the contributions of the two positive lenses.

In the inner focus lens system according to this embodiment, it is preferred that the third lens unit include at least one negative lens.

If the third lens unit includes at least one negative lens, an appropriate back focus can be provided, the Petzval sum can be controlled appropriately, and chromatic aberration can be corrected excellently.

To provide an appropriate back focus, it is desirable that the third lens unit have a negative refractive power or a small positive refractive power. In the case where the third lens unit has a negative refractive power, it is preferred that the third lens unit include at least one negative lens. On the other hand, in the case where the third lens unit has a positive refractive power, it is preferred that the third lens unit include at least one negative lens and at least one positive lens.

In the inner focus lens system according to this embodiment, it is preferred that the third lens unit include at least one positive lens and at least one negative lens.

Having a negative lens and a positive lens in the third lens unit allows reduction of chromatic aberration.

In the inner focus lens system according to this embodiment, it is preferred that at least one negative lens in the third lens unit satisfy the following conditional expression (4):

$$-50 < f_{3n}/f < -0.5 \qquad (4),$$

where $f_{3n}$ is the focal length of at least one negative lens in the third lens unit, and f is the focal length of the entire inner focus lens system in the state in which the inner focus lens system is focused on an object point at infinity.

Conditional expression (4) specifies a preferred condition for achieving both good correction of off-axis aberrations by the negative lens in the third lens unit and size reduction of the lens system.

If the lower limit of conditional expression (4) is reached, good correction of off-axis aberrations by the negative lens can be achieved.

If the upper limit of conditional expression (4) is not exceeded, the thickness of the third lens unit can be made small, and the lens diameter can also be made small.

In the inner focus lens system according to this embodiment, it is preferred that the third lens unit have a positive refractive power.

If the third lens unit has a positive refractive power, the third lens unit can have the function of making the exit pupil position appropriately distant from the image plane. It is preferred that the positive refractive power of the third lens unit be small.

In the inner focus lens system according to this embodiment, it is preferred that the third lens unit have a negative refractive power.

The third lens unit having a negative refractive power is advantageous in providing an appropriate back focus. Furthermore, the third lens unit having a negative refractive power is advantageous for correction of curvature of field.

In the inner focus lens system according to this embodiment, it is preferred that the third lens unit consist of a single lens having a negative refractive power.

The third lens unit consisting of a single lens having a negative refractive power can lead to a reduction in the weight of the lens system.

In the inner focus lens system according to this embodiment, it is preferred that the F-number of the inner focus lens system be equal to or less than 2 and that the half angle of view of the rays that pass the center of the aperture stop and incident on the highest image height positions be larger than 30 degrees.

The F-number not more than 2 and the half angle of view larger than 30 degrees are advantageous for achieving appropriate brightness (or fast speed) and wide angle of view. In consequence, excellent images can be obtained even in the case of shooting in dark places and indoor shooting.

Figure 13:
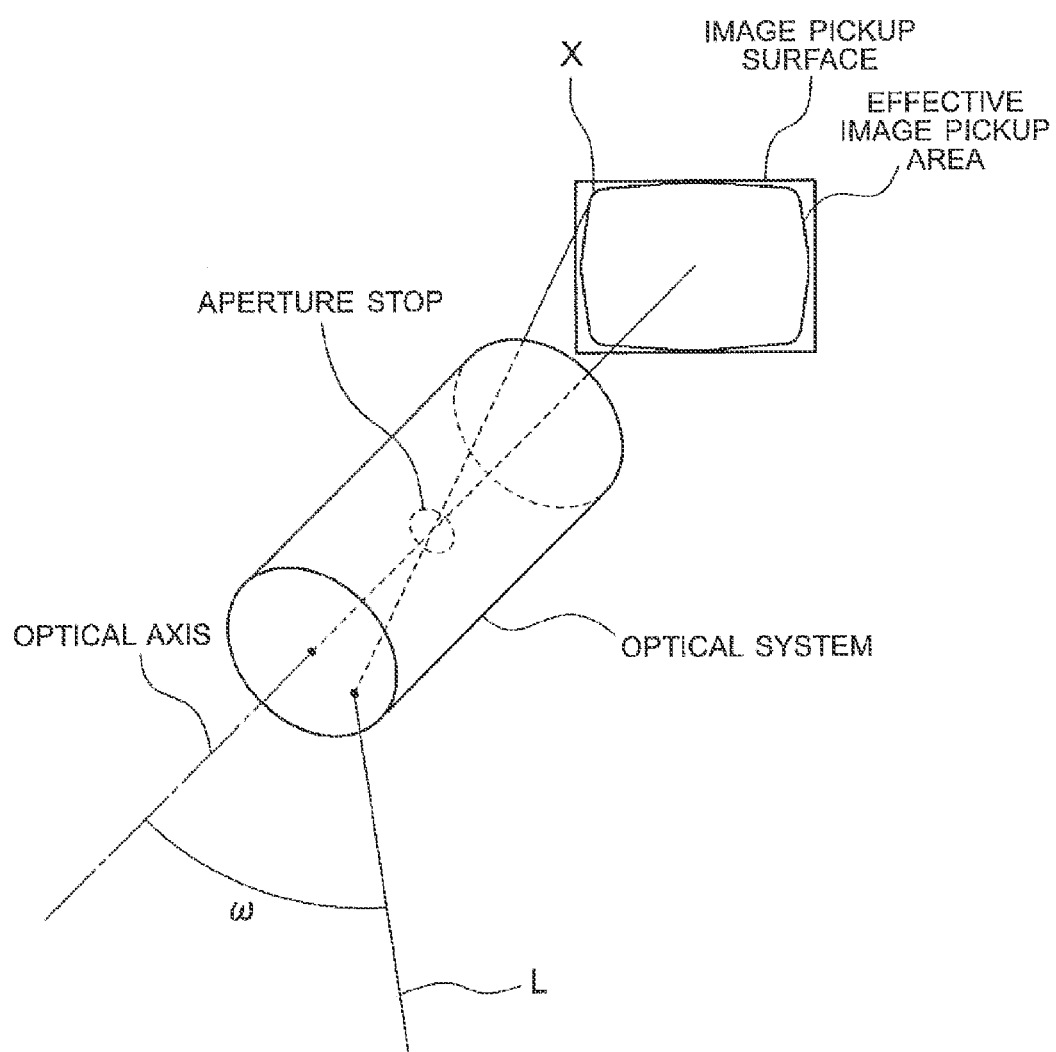
FIG. 13 is a diagram illustrating the half angle of view.

A description will be made now of the half angle of view with reference to FIG. 13. FIG. 13 illustrates an optical system, an aperture stop, and an image pickup surface arranged along the optical axis. Rays entering the optical system pass through the aperture stop, exit from the optical system, and reach the image pickup surface. The optical system shown in FIG. 13 is the inner focus lens system according to this embodiment, and angle ω in FIG. 13 is the half angle of view.

Solid line L in FIG. 13 represents the ray among the rays pass the center of the aperture stop that reaches point X on the effective image pickup area. This point X is at a position most distant from the optical axis in the effective image pickup area. Because the effective image pickup area is the area in which an image of an object is formed, point X is at the highest image height position. Thus, ray L is a ray that passes the center of the aperture stop and incident on the highest image height position in the effective image pickup area. The half angle of view ω is represented by the angle formed by this ray L and the optical axis.

It is preferred that the inner focus lens according to this embodiment satisfy the following conditional expression (5):

$$-1 < f/f_3 < 0.5 \qquad (5),$$

where $f_3$ is the focal length of the third lens unit, and f is the focal length of the entire inner focus lens system in the state in which the inner focus lens system is focused on an object point at infinity.

Conditional expression (5) is a condition for achieving both appropriate exit pupil position and reduction in the overall length of the lens system.

If the lower limit of conditional expression (5) is reached, the exit pupil can be arranged appropriately distant from the image plane.

Not exceeding the upper limit of conditional expression (5) leads to reduction in the overall length of the lens system.

In the inner focus lens system according to this embodiment, it is preferred that the positions of the first lens unit and the third lens unit are fixed during focusing from an infinite object distance to a close object distance.

The configuration in which the positions of the first lens unit and the third lens unit are fixed (namely, the first lens unit and the third lens unit are kept stationary) during the focusing operation is advantageous for preventing the entrance of dust into the lens system and for reducing noises during the focusing drive.

An image pickup apparatus according to one embodiment has the inner focus lens system described above and an image pickup element that is disposed on the image side of the inner focus lens system and converts an image formed by the inner focus lens system into an electrical signal.

With the equipment of the above-described inner focus lens system, there can be provided an image pickup apparatus enjoying the advantages of this lens system.

To enjoy the advantages more definitely, it is preferred that the upper limit value and the lower limit value in the conditional expressions described above be modified as follows to further limit the respective numerical range.

In conditional expression (1), it is preferred that the lower limit value be 1.4, more preferably 1.75 and that the upper limit value be 9, more preferably 7.

In conditional expression (2), it is preferred that the lower limit value be 0.95, more preferably 1, still more preferably 1.05 and that the upper limit value be 2, more preferably 1.4.

In conditional expression (3), it is preferred that the lower limit value be 2.4, more preferably 2.9 and that the upper limit value be 3.6, more preferably 3.4.

In conditional expression (4), it is preferred that the lower limit value be −20, more preferably −10 and that the upper limit value be −0.7, more preferably −0.9.

In conditional expression (5), it is preferred that the lower limit value be −0.5, more preferably −0.3 and that the upper limit value be 0.3, more preferably 0.1.

In the inner focus lens system, two of more of the features described above may be adopted in combination. This is advantageous for achieving better inner focus lens system and image pickup apparatus. Any possible combination of features may be adopted. In the further limitation of the numerical range of the conditional expressions mentioned above, the further limitation may be made only to the upper limit or lower limit.

In the following, examples of the inner focus lens system and the image pickup apparatus according to the present invention will be described with reference to the drawings. It should be understood that the present invention is not limited by the examples.

The lens systems according to the examples described in the following are fast inner focus lens systems having an F-number not more than 2 and an angle of view not smaller than 60 degrees. The inner focus lens systems according to the examples can suitably used as taking lenses of cameras such as digital still cameras.

In the following, first to eighth examples of the inner focus lens system according to the present invention will be described. FIGS. 1A and 1B to 4A and 4B are cross sectional views of the inner focus lens systems according to the first to eighth examples in the state in which the inner focus lens systems are focused on an object point at infinity. In FIGS. 1A and 1B to 4A and 4B, a first lens unit is denoted by G1, an aperture stop is denoted by S, a second lens unit is denoted by G2, a third lens unit is denoted by G3, a plane parallel plate is denoted by C, and the image plane is denoted by I. In FIGS. 1A and 1B to 4A and 4B, filters (including a dust filter, an infrared cut filter, and a low pass filter) and a cover glass for protecting the image pickup surface are collectively illustrated as one plane parallel plate optically equivalent to them.

As shown in FIG. 1A, the inner focus lens system according to the first example includes, in order from the object side, a first lens unit G1 having a positive refractive power, an aperture stop S, a second lens unit G2 having a positive refractive power, and a third lens unit G3 having a negative refractive power.

During focusing from an infinite object distance to a close object distance, the first lens unit G1 is fixed, the aperture stop S is fixed, the second lens unit G2 moves toward the object side, and the third lens unit G3 is fixed.

The first lens unit G1 is composed of a biconcave negative lens L1, a biconvex positive lens L2, and a negative meniscus lens L3 having a convex surface directed toward the image side. The second lens unit G2 is composed of a biconcave negative lens L4, a biconvex positive lens L5, and a biconvex positive lens L6. The biconcave negative lens L4 and the biconvex positive lens L5 are cemented together. The third lens unit G3 is composed of a biconcave negative lens L7, a biconvex positive lens L8, and a biconcave negative lens L9. The biconcave negative lens L7 and the biconvex positive lens L8 are cemented together. The lens elements in each lens unit are arranged in the mentioned order from the object side.

There are six aspheric surfaces, which include both surfaces of the biconvex positive lens L2, both surfaces of the biconvex positive lens L6, and both surfaces of the biconcave negative lens L9.

Figure 1B:
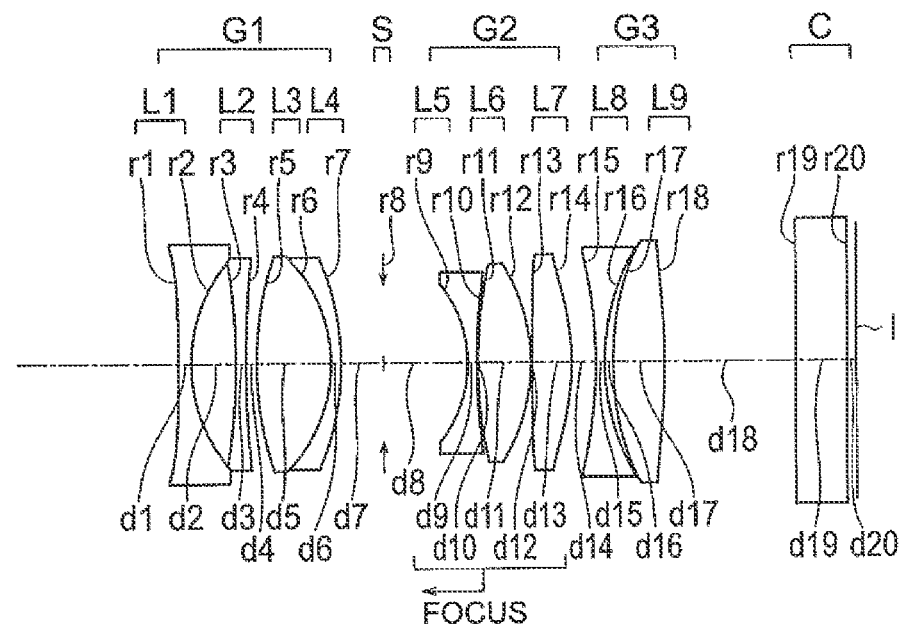
FIG. 1B is a cross sectional view of an inner focus lens system according to a second example of the present invention in the state in which the lens system is focused on an object at infinity.

As shown in FIG. 1B, the inner focus lens system according to the second example includes, in order from the object side, a first lens unit G1 having a positive refractive power, an aperture stop S, a second lens unit G2 having a positive refractive power, and a third lens unit G3 having a negative refractive power.

During focusing from an infinite object distance to a close object distance, the first lens unit G1 is fixed, the aperture stop S is fixed, the second lens unit G2 moves toward the object side, and the third lens unit G3 is fixed.

The first lens unit G1 is composed of a biconcave negative lens L1, a biconcave negative lens L2, a biconvex positive lens L3, and a negative meniscus lens L4 having a convex surface directed toward the image side. The biconvex positive lens L3 and the negative meniscus lens L4 are cemented together. The second lens unit G2 is composed of a biconcave negative lens L5, a biconvex positive lens L6, and a biconvex positive lens L7. The third lens unit G3 is composed of a biconcave negative lens L8 and a biconvex positive lens L9. The lens elements in each lens unit are arranged in the mentioned order from the object side.

There are six aspheric surfaces, which include both surfaces of the biconcave negative lens L1, both surfaces of the biconvex positive lens L7, and both surfaces of the biconvex positive lens L9.

Figure 2A:
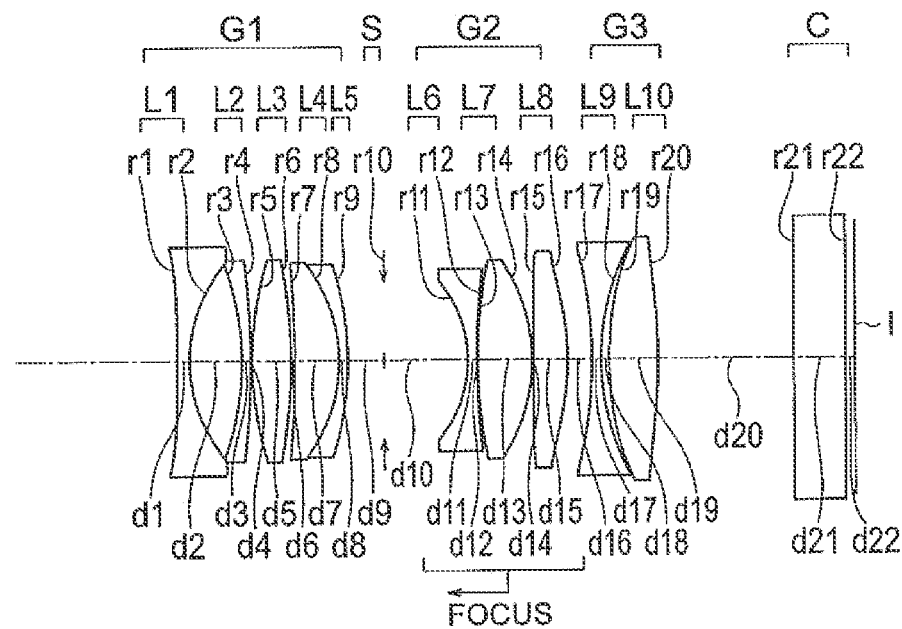
FIG. 2A is a cross sectional view of an inner focus lens system according to a third example of the present invention in the state in which the lens system is focused on an object at infinity.

As shown in FIG. 2A, the inner focus lens system according to the third example includes, in order from the object side, a first lens unit G1 having a positive refractive power, an aperture stop S, a second lens unit G2 having a positive refractive power, and a third lens unit G3 having a negative refractive power.

During focusing from an infinite object distance to a close object distance, the first lens unit G1 is fixed, the aperture stop S is fixed, the second lens unit G2 moves toward the object side, and the third lens unit G3 is fixed.

The first lens unit G1 is composed of a biconcave negative lens L1, a negative meniscus lens L2 having a convex surface directed toward the image side, a biconvex positive lens L3, a positive meniscus lens L4 having a convex surface directed toward the image side, and a negative meniscus lens L5 having a convex surface directed toward the image side. The positive meniscus lens L4 and the negative meniscus lens L5 are cemented together. The second lens unit G2 is composed of a biconcave negative lens L6, a biconvex positive lens L7, and a biconvex positive lens L8. The third lens unit G3 is composed of a biconcave negative lens L9 and a biconvex positive lens L10. The lens elements in each lens unit are arranged in the mentioned order from the object side.

There are six aspheric surfaces, which include both surfaces of the biconcave negative lens L1, both surfaces of the biconvex positive lens L8, and both surfaces of the biconvex positive lens L10.

Figure 2B:
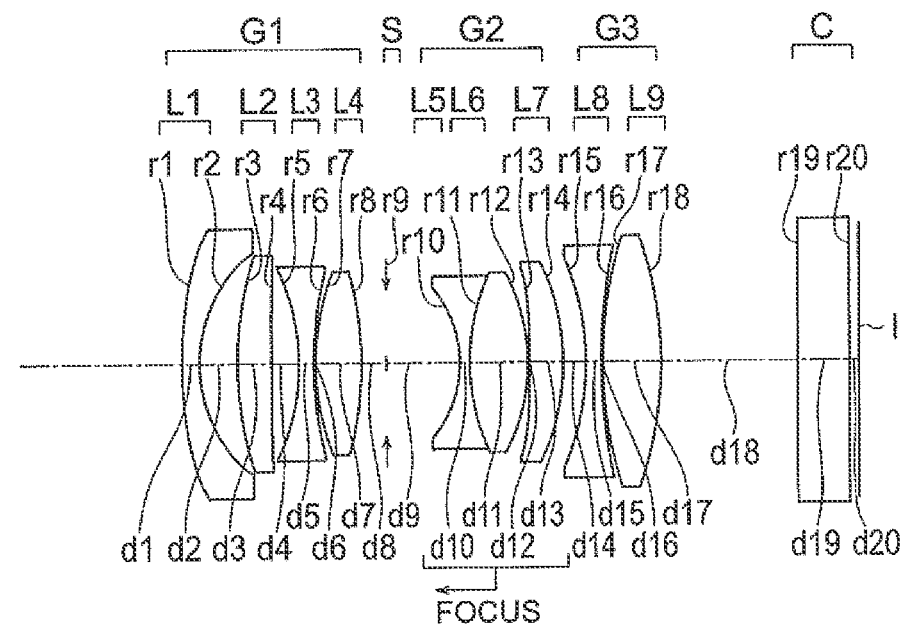
FIG. 2B is a cross sectional view of an inner focus lens system according to a fourth example of the present invention in the state in which the lens system is focused on an object at infinity.

As shown in FIG. 2B, the inner focus lens system according to the fourth example includes, in order from the object side, a first lens unit G1 having a positive refractive power, an aperture stop S, a second lens unit G2 having a positive refractive power, and a third lens unit G3 having a negative refractive power.

During focusing from an infinite object distance to a close object distance, the first lens unit G1 is fixed, the aperture stop S is fixed, the second lens unit G2 moves toward the object side, and the third lens unit G3 is fixed.

The first lens unit G1 is composed of a negative meniscus lens L1 having a convex surface directed toward the object side, a positive meniscus lens L2 having a convex surface directed toward the object side, a biconcave negative lens L3, and a biconvex positive lens L4. The second lens unit G2 is composed of a biconcave negative lens L5, a biconvex positive lens L6, and a positive meniscus lens L7 having a convex surface directed toward the image side. The biconcave negative lens L5 and the biconvex positive lens L6 are cemented together. The third lens unit G3 is composed of a biconcave negative lens L8 and a biconvex positive lens L9. The lens elements in each lens unit are arranged in the mentioned order from the object side.

There are six aspheric surfaces, which include both surfaces of the negative meniscus lens L1, both surfaces of the positive meniscus lens L7, and both surfaces of the biconvex positive lens L9.

Figure 3A:
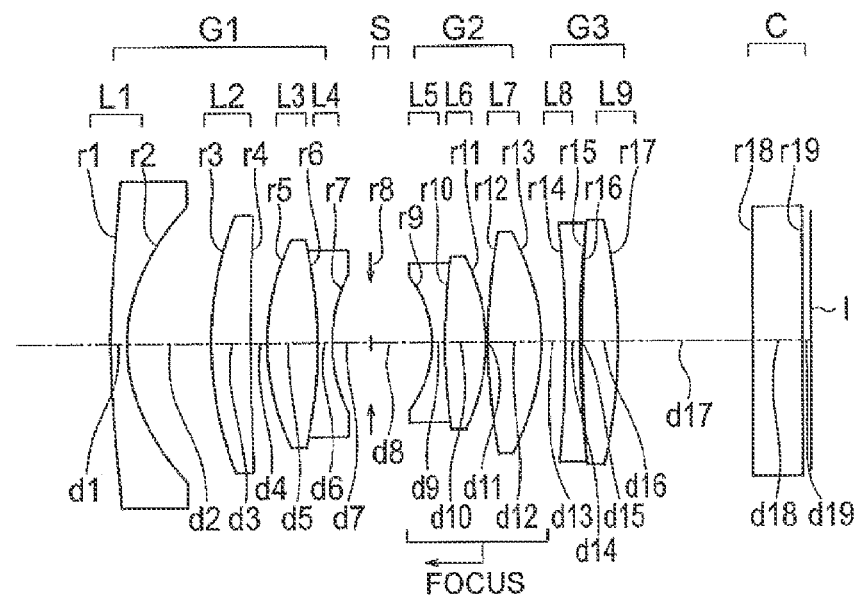
FIG. 3A is a cross sectional view of an inner focus lens system according to a fifth example of the present invention in the state in which the lens system is focused on an object at infinity.

As shown in FIG. 3A, the inner focus lens system according to the fifth example includes, in order from the object side, a first lens unit G1 having a positive refractive power, an aperture stop S, a second lens unit G2 having a positive refractive power, and a third lens unit G3 having a positive refractive power.

During focusing from an infinite object distance to a close object distance, the first lens unit G1 is fixed, the aperture stop S is fixed, the second lens unit G2 moves toward the object side, and the third lens unit G3 is fixed.

The first lens unit G1 is composed of a negative meniscus lens L1 having a convex surface directed toward the object side, a positive meniscus lens L2 having a convex surface directed toward the object side, a biconvex positive lens L3, and a biconcave negative lens L4. The biconvex positive lens L3 and the biconcave negative lens L4 are cemented together. The second lens unit G2 is composed of a biconcave negative lens L5, a biconvex positive lens L6, and a biconvex positive lens L7. The biconcave negative lens L5 and the biconvex positive lens L6 are cemented together. The third lens unit G3 is composed of a biconcave negative lens L8 and a biconvex positive lens L9. The lens elements in each lens unit are arranged in the mentioned order from the object side.

There are four aspheric surfaces, which include both surfaces of the negative meniscus lens L1 and both surfaces of the biconvex positive lens L7.

Figure 3B:
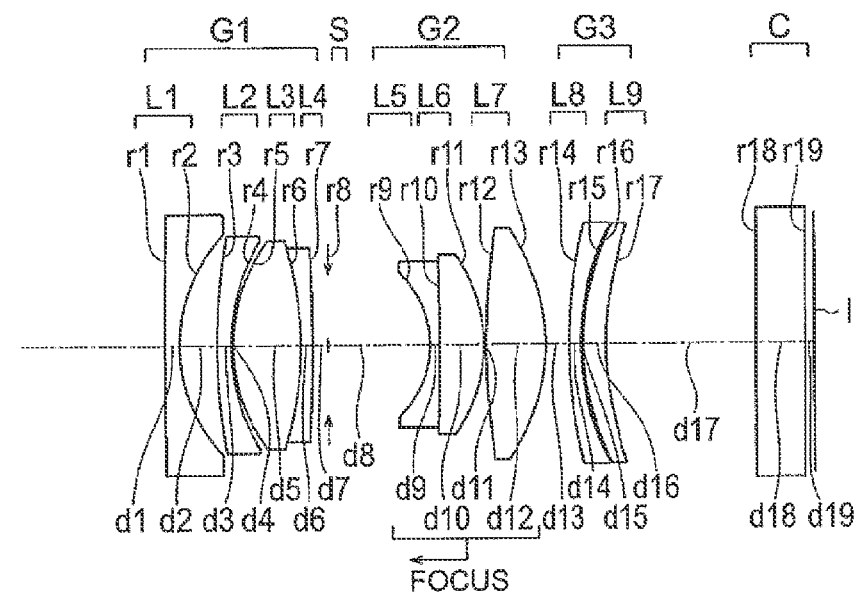
FIG. 3B is a cross sectional view of an inner focus lens system according to a sixth example of the present invention in the state in which the lens system is focused on an object at infinity.

As shown in FIG. 3B, the inner focus lens system according to the sixth example includes, in order from the object side, a first lens unit G1 having a positive refractive power, an aperture stop S, a second lens unit G2 having a positive refractive power, and a third lens unit G3 having a negative refractive power.

During focusing from an infinite object distance to a close object distance, the first lens unit G1 is fixed, the aperture stop S is fixed, the second lens unit G2 moves toward the object side, and the third lens unit G3 is fixed.

The first lens unit G1 is composed of a negative meniscus lens L1 having a convex surface directed toward the object side, a negative meniscus lens L2 having a convex surface directed toward the object side, a biconvex positive lens L3, and a negative meniscus lens L4 having a convex surface directed toward the image side. The biconvex positive lens L3 and the negative meniscus lens L4 are cemented together. The second lens unit G2 is composed of a negative meniscus lens L5 having a convex surface directed toward the image side, a positive meniscus lens L6 having a convex surface directed toward the image side and a biconvex positive lens L7. The negative meniscus lens L5 and the positive meniscus lens L6 are cemented together. The third lens unit G3 is composed of a negative meniscus lens L8 having a convex surface directed toward the object side and a positive meniscus lens L9 having a convex surface directed toward the object side. The lens elements in each lens unit are arranged in the mentioned order from the object side.

There are five aspheric surfaces, which include the image side surface of the negative meniscus lens L1, both surfaces of the biconvex positive lens L7, and both surfaces of the positive meniscus lens L9.

Figure 4A:
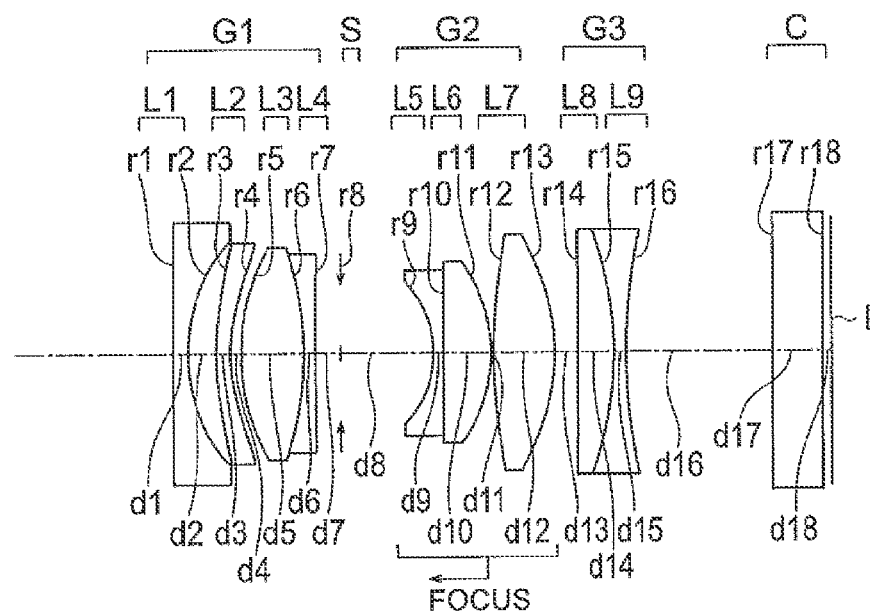
FIG. 4A is a cross sectional view of an inner focus lens system according to a seventh example of the present invention in the state in which the lens system is focused on an object at infinity.

As shown in FIG. 4A, the inner focus lens system according to the seventh example includes, in order from the object side, a first lens unit G1 having a positive refractive power, an aperture stop S, a second lens unit G2 having a positive refractive power, and a third lens unit G3 having a positive refractive power.

During focusing from an infinite object distance to a close object distance, the first lens unit G1 is fixed, the aperture stop S is fixed, the second lens unit G2 moves toward the object side, and the third lens unit G3 is fixed.

The first lens unit G1 is composed of a negative meniscus lens L1 having a convex surface directed toward the object side, a negative meniscus lens L2 having a convex surface directed toward the object side, a biconvex positive lens L3, and a biconcave negative lens L4. The biconvex positive lens L3 and the biconcave negative lens L4 are cemented together. The second lens unit G2 is composed of a biconcave negative lens L5, a biconvex positive lens L6, and a biconvex positive lens L7. The biconcave negative lens L5 and the biconvex positive lens L6 are cemented together. The third lens unit G3 is composed of a positive meniscus lens L8 having a convex surface directed toward the image side and a biconcave negative lens L9. The positive meniscus lens L8 and the biconcave negative lens L9 are cemented together. The lens elements in each lens unit are arranged in the mentioned order from the object side.

There are six aspheric surfaces, which include both surface of the negative meniscus lens L1, both surfaces of the negative meniscus lens L2, and both surfaces of the biconvex positive lens L7.

Figure 4B:
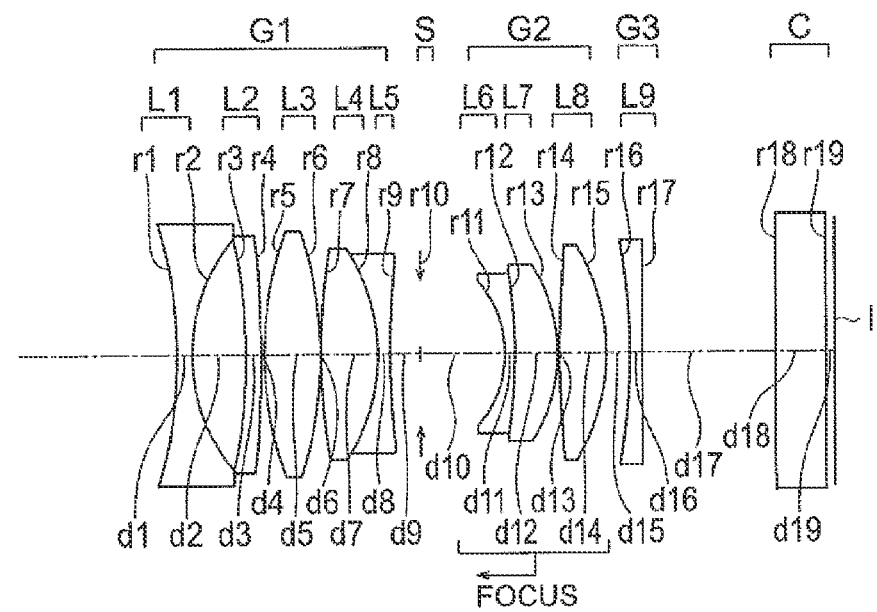
FIG. 4B is a cross sectional view of an inner focus lens system according to a eighth example of the present invention in the state in which the lens system is focused on an object at infinity.
Figure 8A:
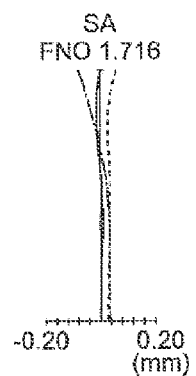
FIGS. 8A, 8B, 8C, 8D, 8E, 8F, 8G, 8H, 8I, 8J, 8K, and 8L are aberration diagrams of the inner focus lens system according to the fourth example in three different focus states.
Figure 8B:
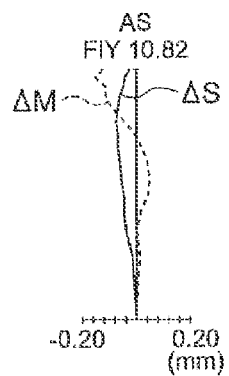
Figure 8C:
Figure 8D:
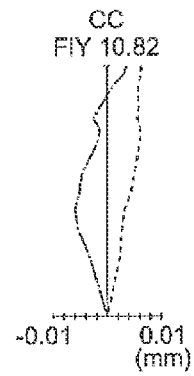
Figure 8E:
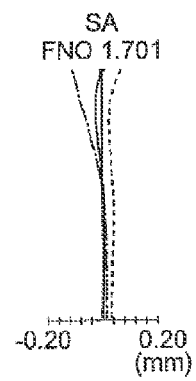
Figure 8F:
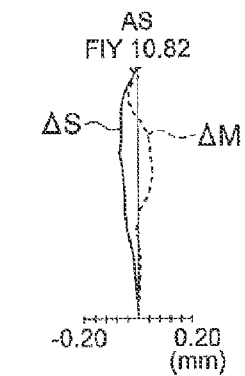
Figure 8G:
Figure 8H:
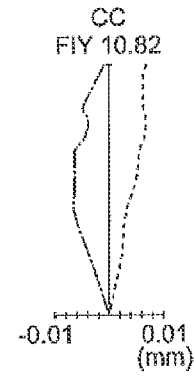
Figure 8I:
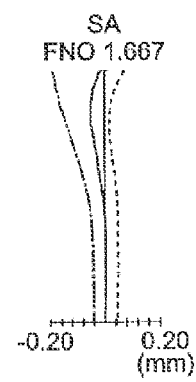
Figure 8J:
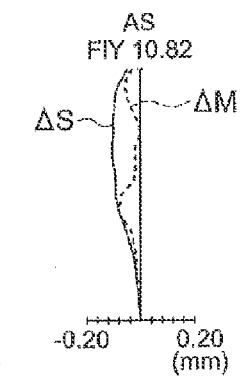
Figure 8K:
Figure 8L:
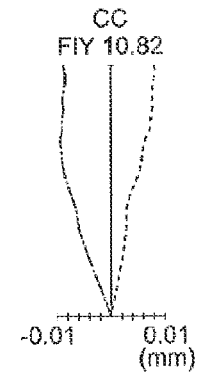

As shown in FIG. 4B, the inner focus lens system according to the eighth example includes, in order from the object side, a first lens unit G1 having a positive refractive power, an aperture stop S, a second lens unit G2 having a positive refractive power, and a third lens unit G3 having a negative refractive power.

During focusing from an infinite object distance to a close object distance, the first lens unit G1 is fixed, the aperture stop S is fixed, the second lens unit G2 moves toward the object side, and the third lens unit G3 is fixed.

The first lens unit G1 is composed of a biconcave negative lens L1, a negative meniscus lens L2 having a convex surface directed toward the image side, a biconvex positive lens L3, a biconvex positive lens L4, and a biconcave negative lens L5. The biconvex positive lens L4 and the biconcave negative lens L5 are cemented together. The second lens unit G2 is composed of a negative meniscus lens having a convex surface directed toward the image side, a positive meniscus lens L7 having a convex surface directed toward the image side, and a biconvex positive lens L8. The negative meniscus lens L6 and the positive meniscus lens L7 are cemented together. The third lens unit G3 is composed of a biconcave negative lens L9. The lens elements in each lens unit are arranged in the mentioned order from the object side.

There are six aspheric surfaces, which include both surfaces of the biconcave negative lens L1, both surfaces of the negative meniscus lens L2, and both surfaces of the biconvex positive lens L8.

In the following, numerical data of the above-described examples are presented. Among notations used in the numerical data other than those mentioned above, r is the radius of curvature of each lens surface, d is the distance between lens surfaces, nd is the refractive index of each lens for the d-line, vd is the Abbe constant of each lens, "focal length" refers to the focal length of the entire lens system, FNO. is the F-number, ω is the half angle of view, f1, f2, . . . are focal length of the respective lens units. The overall length is the distance from the frontmost lens surface to the rearmost lens surface plus back focus. Further, fb (back focus) is the distance from the rearmost lens surface to the paraxial image plane represented by an equivalent air distance.

In the focusing state data, "Infinity" refers to the state in which the lens system is focused on an object at infinity, "Magnification is $-1/10$" refers to the state in which the lens system is focused on an object for which the magnification is $-1/10$, and "Object-image distance is 200 mm" refers to the state in which the lens system is focused on an object for which the distance between the object and the paraxial image plane is 200 mm. The state in which the lens system is focused on an object at a close distance may be, for example, the state in which the distance between the object and the paraxial image plane is 200 mm.

When x is let to be an optical axis with a direction of traveling of light as a positive (direction), and y is let to be in a direction orthogonal to the optical axis, a shape of the aspheric surface is described by the following expression.

$$x=(y^2/R)/[1+\{1-(K+1)(y/R)^2\}^{1/2}]+A4y^4+A6y^6+A8y^8+A10y^{10}+A12y^{12}$$

where, R denotes a paraxial radius of curvature, K denotes a conical coefficient, A4, A6, A8, A10, and A12 denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

EXAMPLE 1

| Unit mm | | | | |
|---|---|---|---|---|
| Surface data | | | | |
| Surface no. | r | d | nd | vd |
| Object plane | ∞ | ∞ | | |
| 1 | −69.296 | 1.00 | 1.51823 | 58.90 |
| 2 | 16.235 | 4.37 | | |
| 3* | 21.796 | 4.78 | 1.80610 | 40.92 |
| 4* | −32.981 | 0.64 | | |
| 5 | −28.404 | 1.00 | 1.72825 | 28.46 |
| 6 | −75.460 | 1.99 | | |
| 7(stop) | ∞ | Variable | | |
| 8 | −9.069 | 0.70 | 1.59270 | 35.31 |
| 9 | 13.490 | 4.20 | 1.74320 | 49.34 |
| 10 | −29.061 | 0.24 | | |
| 11* | 63.973 | 3.96 | 1.74320 | 49.29 |
| 12* | −13.234 | Variable | | |
| 13 | −33.627 | 0.70 | 1.66680 | 33.05 |
| 14 | 21.161 | 5.22 | 1.80610 | 40.92 |
| 15 | −21.817 | 0.22 | | |
| 16* | −22.219 | 0.70 | 1.64769 | 33.79 |
| 17* | 390.353 | 10.81 | | |
| 18 | ∞ | 4.08 | 1.51633 | 64.14 |
| 19 | ∞ | 0.75 | | |
| Image plane(Image pickup surface) ∞ | | | | |

| Aspherical surface data | | |
|---|---|---|
| 3rd surface | | |
| k = 0.000 | | |
| A4 = 2.41601e−05, | A6 = 1.34301e−07, | A8 = 1.90055e−10, |
| A10 = 1.10342e−11 | | |
| 4th surface | | |
| k = 0.000 | | |
| A4 = 1.62019e−05, | A6 = 6.88014e−08, | A8 = 1.04347e−10 |
| 11th surface | | |
| k = 0.000 | | |
| A4 = −3.67593e−05, | A6 = 4.77634e−07, | A8 = −8.84790e−09, |
| A10 = 4.07579e−12 | | |
| 12th surface | | |
| k = 0.000 | | |
| A4 = 9.93764e−05, | A6 = 3.98206e−07, | A8 = −5.72132e−09, |
| A10 = 8.15583e−12 | | |

-continued

Unit mm

16th surface k = 0.000
A4 = 1.88114e−04,   A6 = −3.89115e−06,   A8 = 3.14700e−08,
A10 = −7.59619e−11
17th surface k = 0.000
A4 = 1.75313e−04,   A6 = −3.76695e−06,   A8 = 3.58444e−08,
A10 = −1.10025e−10

Various data

| Focal length | 17.27 |
|---|---|
| Fno. | 1.72 |
| Angle of field 2ω | 68.62 |
| fb (in air) | 14.25 |
| Lens total length (in air) | 52.17 |
| Image height | 10.82 |

In focus state

Infinity

| d7 | 6.61 |
|---|---|
| d12 | 1.60 |

Magnification is −1/10

| d7 | 6.15 |
|---|---|
| d12 | 2.06 |

Object—Image distance is 200 mm

| d7 | 5.07 |
|---|---|
| d12 | 3.14 |

Unit focal length

| f1 = 70.52 | f2 = 17.85 | f3 = −151.61 |
|---|---|---|

EXAMPLE 2

Unit mm

Surface data

| Surface no. | r | d | nd | vd |
|---|---|---|---|---|
| Object plane | ∞ | ∞ | | |
| 1* | −400.000 | 1.00 | 1.51633 | 64.14 |
| 2* | 12.678 | 3.55 | | |
| 3 | −49.555 | 0.80 | 1.49700 | 81.54 |
| 4 | 82.373 | 0.84 | | |
| 5 | 26.827 | 5.89 | 1.83481 | 42.71 |
| 6 | −11.929 | 0.80 | 1.80518 | 25.42 |
| 7 | −21.066 | 3.38 | | |
| 8(stop) | ∞ | Variable | | |
| 9 | −9.968 | 0.70 | 1.69895 | 30.13 |
| 10 | 49.045 | 0.10 | | |
| 11 | 36.720 | 4.20 | 1.75700 | 47.82 |
| 12 | −14.750 | 0.10 | | |
| 13* | 400.000 | 3.16 | 1.74320 | 49.29 |
| 14* | −19.373 | Variable | | |
| 15 | −36.779 | 0.70 | 1.64769 | 33.79 |
| 16 | 18.101 | 0.65 | | |
| 17* | 25.925 | 4.01 | 1.80610 | 40.92 |
| 18* | −51.427 | 10.30 | | |
| 19 | ∞ | 4.08 | 1.51633 | 64.14 |
| 20 | ∞ | 0.74 | | |
| Image plane (Image pickup surface) | ∞ | | | |

-continued

Unit mm

Aspherical surface data

1st surface k = 100.000
A4 = −5.34986e−05,   A6 = −4.79413e−07,   A8 = 2.00277e−09,
A10 = −5.77532e−13
2nd surface k = −0.673
A4 = 5.59739e−05,   A6 = 5.36913e−09,   A8 = −5.06330e−09,
A10 = 6.52119e−11
13th surface k = 0.000
A4 = −2.10905e−05,   A6 = 1.03605e−06,   A8 = −1.80777e−08,
A10 = 2.55010e−10,   A12 = −1.16748e−12
14th surface k = 0.000
A4 = 5.20635e−05,   A6 = 4.68554e−07,   A8 = −3.37362e−09,
A10 = 6.50534e−11
17th surface k = 0.000
A4 = 4.98109e−05,   A6 = −4.84066e−07,   A8 = 9.43359e−09,
A10 = −5.83544e−11
18th surface k = 0.000
A4 = 3.73054e−05,   A6 = −5.60559e−07,   A8 = 1.14495e−08,
A10 = −6.30363e−11

Various data

| Focal length | 17.34 |
|---|---|
| Fno. | 1.72 |
| Angle of field 2ω | 68.61 |
| fb (in air) | 13.74 |
| Lens total length (in air) | 52.18 |
| Image height | 10.82 |

In focus state

Infinity

| d8 | 6.66 |
|---|---|
| d14 | 1.90 |

Magnification is −1/10

| d8 | 6.10 |
|---|---|
| d14 | 2.45 |

Object—Image distance is 200 mm

| d8 | 4.87 |
|---|---|
| d14 | 3.69 |

Unit focal length

| f1 = 32.39 | f2 = 22.00 | f3 = −240.35 |
|---|---|---|

EXAMPLE 3

Unit mm

Surface data

| Surface no. | r | d | nd | vd |
|---|---|---|---|---|
| Object plane | ∞ | ∞ | | |
| 1* | −400.000 | 1.00 | 1.51633 | 64.14 |
| 2* | 11.737 | 4.15 | | |
| 3 | −21.991 | 0.71 | 1.49700 | 81.54 |

-continued

Unit mm

| | | | | |
|---|---|---|---|---|
| 4 | −65.112 | 0.11 | | |
| 5 | 28.013 | 3.00 | 1.83481 | 42.71 |
| 6 | −44.074 | 0.31 | | |
| 7 | −86.746 | 3.51 | 1.83481 | 42.71 |
| 8 | −12.794 | 0.70 | 1.80518 | 25.42 |
| 9 | −24.813 | 2.88 | | |
| 10(stop) | ∞ | Variable | | |
| 11 | −9.812 | 0.70 | 1.69895 | 30.13 |
| 12 | 53.040 | 0.10 | | |
| 13 | 38.469 | 4.30 | 1.78800 | 47.37 |
| 14 | −14.305 | 0.10 | | |
| 15* | 400.000 | 2.72 | 1.74320 | 49.29 |
| 16* | −21.830 | Variable | | |
| 17 | −34.792 | 0.70 | 1.64769 | 33.79 |
| 18 | 19.198 | 0.66 | | |
| 19* | 29.321 | 3.85 | 1.80610 | 40.92 |
| 20* | −43.934 | 10.66 | | |
| 21 | ∞ | 4.08 | 1.51633 | 64.14 |
| 22 | ∞ | 0.75 | | |
| Image plane(Image pickup surface) ∞ | | | | |

Aspherical surface data

1st surface k = 100.000
A4 = −5.67198e−05, A6 = −2.01281e−07, A8 = −9.07722e−10,
A10 = 9.74273e−12
2nd surface k = −0.734
A4 = 3.29416e−05, A6 = 4.79925e−07, A8 = −1.33692e−08,
A10 = 9.60266e−11
15th surface k = 0.000
A4 = −3.78249e−05, A6 = 5.74494e−07, A8 = 7.15211e−10,
A10 = 1.56983e−11, A12 = −1.24749e−13
16th surface k = 0.000
A4 = 2.77037e−05, A6 = 3.58314e−07, A8 = 1.01277e−08,
A10 = −1.34098e−10, A12 = 9.70146e−13
19th surface k = 0.000
A4 = 3.53596e−05, A6 = 5.39334e−07, A8 = −4.17195e−09,
A10 = −3.77804e−12
20th surface k = 0.000
A4 = 2.86889e−05, A6 = 2.29666e−07, A8 = 1.70266e−09,
A10 = −3.20544e−11

Various data

| | |
|---|---|
| Focal length | 17.36 |
| Fno. | 1.72 |
| Angle of field 2ω | 68.59 |
| fb (in air) | 14.10 |
| Lens total length (in air) | 52.18 |
| Image height | 10.82 |

In focus state

Infinity

| | |
|---|---|
| d10 | 6.67 |
| d16 | 1.90 |

Magnification is −1/10

| | |
|---|---|
| d10 | 6.12 |
| d16 | 2.45 |

Object—Image distance is 200 mm

| | |
|---|---|
| d10 | 4.87 |
| d16 | 3.70 |

Unit mm

Unit focal length

| | | |
|---|---|---|
| f1 = 32.24 | f2 = 22.44 | f3 = −257.41 |

EXAMPLE 4

Unit mm

Surface data

| Surface no. | r | d | nd | vd |
|---|---|---|---|---|
| Object plane | ∞ | ∞ | | |
| 1* | 33.085 | 1.40 | 1.58313 | 59.38 |
| 2* | 11.349 | 3.00 | | |
| 3 | 27.663 | 2.67 | 1.91082 | 35.25 |
| 4 | 331.721 | 2.16 | | |
| 5 | −17.561 | 1.20 | 1.65834 | 31.86 |
| 6 | 29.670 | 0.15 | | |
| 7 | 19.863 | 3.61 | 1.88300 | 40.76 |
| 8 | −27.507 | 2.00 | | |
| 9(stop) | ∞ | Variable | | |
| 10 | −9.313 | 0.80 | 1.64726 | 32.67 |
| 11 | 16.517 | 4.62 | 1.88300 | 40.76 |
| 12 | −15.343 | 0.15 | | |
| 13* | −102.770 | 2.66 | 1.80610 | 40.92 |
| 14* | −18.452 | Variable | | |
| 15 | −21.498 | 1.20 | 1.80927 | 25.07 |
| 16 | 42.091 | 0.15 | | |
| 17* | 35.847 | 4.62 | 1.80610 | 40.92 |
| 18* | −29.118 | 10.75 | | |
| 19 | ∞ | 4.08 | 1.51633 | 64.14 |
| 20 | ∞ | 0.75 | | |
| Image plane(Image pickup surface) ∞ | | | | |

Aspherical surface data

1st surface k = 0.000
A4 = −1.80856e−05, A6 = 3.87830e−07
2nd surface k = 0.385
A4 = −8.54254e−05, A6 = −9.23948e−08
13th surface k = 0.000
A4 = −9.40289e−05, A6 = −2.31647e−07, A8 = −1.07583e−08
14th surface k = 0.000
A4 = 1.22124e−05, A6 = −2.82100e−07, A8 = −4.15598e−09
17th surface k = 0.000
A4 = 2.25050e−05, A6 = −7.85701e−08
18th surface k = 0.000
A4 = 4.35638e−07, A6 = 5.55190e−08

Various data

| | |
|---|---|
| Focal length | 17.34 |
| Fno. | 1.72 |
| Angle of field 2ω | 68.02 |
| fb (in air) | 14.19 |
| Lens total length (in air) | 52.18 |
| Image height | 10.82 |

-continued

| Unit mm | |
|---|---|
| In focus state | |
| Infinity | |
| d9 | 5.85 |
| d14 | 1.75 |
| Magnification is −1/10 | |
| d9 | 5.38 |
| d14 | 2.22 |
| Object—Image distance is 200 mm | |
| d9 | 4.31 |
| d14 | 3.29 |

| Unit focal length | | |
|---|---|---|
| f1 = 46.97 | f2 = 18.50 | f3 = −324.73 |

EXAMPLE 5

| Unit mm | | | | |
|---|---|---|---|---|
| Surface data | | | | |
| Surface no. | r | d | nd | νd |
| Object plane | ∞ | ∞ | | |
| 1* | 69.444 | 1.40 | 1.58313 | 59.38 |
| 2* | 14.197 | 7.00 | | |
| 3 | 29.271 | 3.35 | 1.91082 | 35.25 |
| 4 | 262.593 | 1.37 | | |
| 5 | 19.598 | 4.26 | 1.88300 | 40.76 |
| 6 | −38.817 | 1.20 | 1.64769 | 33.79 |
| 7 | 12.762 | 3.25 | | |
| 8(stop) | ∞ | Variable | | |
| 9 | −9.222 | 1.08 | 1.74077 | 27.79 |
| 10 | 48.315 | 3.45 | 1.78800 | 47.37 |
| 11 | −16.098 | 0.15 | | |
| 12* | 44.265 | 4.48 | 1.74320 | 49.29 |
| 13* | −16.888 | Variable | | |
| 14 | −90.718 | 1.20 | 1.59270 | 35.31 |
| 15 | 98.927 | 0.15 | | |
| 16 | 108.834 | 3.00 | 1.49700 | 81.54 |
| 17 | −46.968 | 11.29 | | |
| 18 | ∞ | 4.08 | 1.51633 | 64.14 |
| 19 | ∞ | 0.75 | | |
| Image plane(Image pickup surface) ∞ | | | | |

Aspherical surface data

1st surface k = 1.695
A4 = −1.37350e−05,  A6 = −2.77124e−09
2nd surface k = −0.745
A4 = 8.54124e−06,  A6 = −3.52897e−08
12th surface k = 1.135
A4 = −1.94599e−05,  A6 = 9.04736e−08,  A8 = −4.25344e−10
13th surface k = −2.096
A4 = −1.11021e−05,  A6 = 5.60527e−08,  A8 = −2.13390e−10

Various data

Focal length  17.34
Fno.  1.72

-continued

| Unit mm | |
|---|---|
| Angle of field 2ω | 68.18 |
| fb (in air) | 14.73 |
| Lens total length (in air) | 57.18 |
| Image height | 10.82 |
| In focus state | |
| Infinity | |
| d8 | 5.11 |
| d13 | 2.00 |
| Magnification is −1/10 | |
| d8 | 4.50 |
| d13 | 2.62 |
| Object—Image distance is 200 mm | |
| d8 | 3.02 |
| d13 | 4.10 |

| Unit focal length | | |
|---|---|---|
| f1 = 102.55 | f2 = 18.89 | f3 = 348.93 |

EXAMPLE 6

| Unit mm | | | | |
|---|---|---|---|---|
| Surface data | | | | |
| Surface no. | r | d | nd | νd |
| Object plane | ∞ | ∞ | | |
| 1 | 672.761 | 1.20 | 1.58313 | 59.38 |
| 2* | 13.584 | 3.15 | | |
| 3 | 51.861 | 1.20 | 1.49700 | 81.54 |
| 4 | 16.899 | 0.17 | | |
| 5 | 14.589 | 5.71 | 1.81600 | 46.62 |
| 6 | −27.642 | 1.00 | 1.59270 | 35.31 |
| 7 | −126.683 | 1.27 | | |
| 8(stop) | ∞ | Variable | | |
| 9 | −8.333 | 0.80 | 1.75520 | 27.51 |
| 10 | −340.070 | 3.71 | 1.72916 | 54.68 |
| 11 | −13.125 | 0.20 | | |
| 12* | 57.837 | 4.98 | 1.69350 | 53.21 |
| 13* | −14.919 | Variable | | |
| 14 | 41.929 | 1.00 | 1.59270 | 35.31 |
| 15 | 21.742 | 0.15 | | |
| 16* | 17.103 | 1.89 | 1.69350 | 53.21 |
| 17* | 20.246 | 12.56 | | |
| 18 | ∞ | 4.08 | 1.51633 | 64.14 |
| 19 | ∞ | 0.75 | | |
| Image plane(Image pickup surface) ∞ | | | | |

Aspherical surface data

2nd surface k = −0.083
A4 = 1.18566e−05,  A6 = −4.05288e−08,  A8 = 1.49099e−09
12th surface k = 7.009
A4 = −5.93250e−06,  A6 = −1.84305e−07,  A8 = 5.78519e−10
13th surface k = −1.026
A4 = 2.29476e−05,  A6 = −1.32281e−07,  A8 = 8.15241e−11
16th surface k = 0.345
A4 = −1.35924e−04,  A6 = 2.90102e−07,  A8 = 1.13155e−09

-continued

Unit mm

17th surface k = −3.090
A4 = −1.11559e−04,    A6 = 5.29638e−07,    A8 = 1.00115e−09

Various data

| | |
|---|---|
| Focal length | 17.24 |
| Fno. | 1.72 |
| Angle of field 2ω | 69.27 |
| fb (in air) | 16.00 |
| Lens total length (in air) | 52.90 |
| Image height | 10.82 |

In focus state

Infinity

| | |
|---|---|
| d8 | 8.55 |
| d13 | 1.93 |

Magnification is −1/10

| | |
|---|---|
| d8 | 8.00 |
| d13 | 2.48 |

Object—Image distance is 200 mm

| | |
|---|---|
| d8 | 6.73 |
| d13 | 3.74 |

Unit focal length

| | | |
|---|---|---|
| f1 = 66.76 | f2 = 19.39 | f3 = −179.06 |

EXAMPLE 7

Unit mm

Surface data

| Surface no. | r | d | nd | vd |
|---|---|---|---|---|
| Object plane | ∞ | ∞ | | |
| 1* | 672.764 | 1.20 | 1.58313 | 59.38 |
| 2* | 14.063 | 2.25 | | |
| 3* | 17.686 | 1.20 | 1.52542 | 55.78 |
| 4* | 12.707 | 0.88 | | |
| 5 | 17.675 | 5.13 | 1.88300 | 40.76 |
| 6 | −26.463 | 1.00 | 1.59270 | 35.31 |
| 7 | 406.919 | 2.06 | | |
| 8(stop) | ∞ | Variable | | |
| 9 | −8.299 | 0.80 | 1.75520 | 27.51 |
| 10 | 1136.001 | 3.87 | 1.72916 | 54.68 |
| 11 | −12.587 | 0.20 | | |
| 12* | 41.430 | 5.00 | 1.69350 | 53.21 |
| 13* | −16.249 | Variable | | |
| 14 | −1971.283 | 2.91 | 1.91082 | 35.25 |
| 15 | −28.677 | 1.00 | 1.64769 | 33.79 |
| 16 | 47.347 | 11.86 | | |
| 17 | ∞ | 4.08 | 1.51633 | 64.14 |
| 18 | ∞ | 0.75 | | |
| Image plane(Image pickup surface) | ∞ | | | |

Aspherical surface data

1st surface k = −10.003
A4 = −1.10225e−05,    A6 = 1.37365e−07,    A8 = −5.06683e−10

2nd surface k = 0.542
A4 = −6.97776e−05,    A6 = −5.14847e−08,    A8 = 6.34945e−09

-continued

Unit mm

3rd surface k = −3.220
A4 = −2.93440e−04,    A6 = 3.63340e−06,    A8 = −1.64868e−08

4th surface k = 0.399
A4 = −4.12598e−04,    A6 = 3.90113e−06,    A8 = −3.28816e−08

12th surface k = −2.867
A4 = −2.40751e−05,    A6 = 8.31714e−08,    A8 = −1.04702e−11

13th surface k = −0.777
A4 = 2.17646e−05,    A6 = −5.83764e−08,    A8 = 4.83531e−10

Various data

| | |
|---|---|
| Focal length | 17.11 |
| Fno. | 1.72 |
| Angle of field 2ω | 69.38 |
| fb (in air) | 15.30 |
| Lens total length (in air) | 52.24 |
| Image height | 10.82 |

In focus state

Infinity

| | |
|---|---|
| d8 | 7.55 |
| d13 | 1.89 |

Magnification is −1/10

| | |
|---|---|
| d8 | 7.03 |
| d13 | 2.41 |

Object—Image distance is 200 mm

| | |
|---|---|
| d8 | 5.84 |
| d13 | 3.60 |

Unit focal length

| | | |
|---|---|---|
| f1 = 69.21 | f2 = 18.16 | f3 = −204.21 |

EXAMPLE 8

Unit mm

Surface data

| Surface no. | r | d | nd | vd |
|---|---|---|---|---|
| Object plane | ∞ | ∞ | | |
| 1* | −40.594 | 1.20 | 1.58313 | 59.38 |
| 2* | 15.652 | 4.41 | | |
| 3* | −46.287 | 1.20 | 1.49700 | 81.54 |
| 4* | −124.746 | 0.27 | | |
| 5 | 29.483 | 4.64 | 1.91082 | 35.25 |
| 6 | −31.566 | 0.05 | | |
| 7 | 52.305 | 4.64 | 1.81600 | 46.62 |
| 8 | −15.723 | 1.00 | 1.75211 | 25.05 |
| 9 | 69.165 | 2.44 | | |
| 10(stop) | ∞ | Variable | | |
| 11 | −9.047 | 0.80 | 1.75520 | 27.51 |
| 12 | −43.675 | 3.51 | 1.69680 | 55.53 |
| 13 | −13.342 | 0.15 | | |
| 14* | 72.246 | 3.82 | 1.74320 | 49.34 |
| 15* | −15.821 | Variable | | |
| 16 | −53.355 | 1.00 | 1.59270 | 35.31 |
| 17 | 2895.889 | 10.82 | | |

-continued

Unit mm

| 18 | ∞ | 4.08 | 1.51633 | 64.14 |
| 19 | ∞ | 0.75 | | |
| Image plane(Image pickup surface) ∞ | | | | |

Aspherical surface data

1st surface k = 0.138
A4 = −5.28820e−06,  A6 = −1.04148e−07,  A8 = 5.10478e−10
2nd surface k = 0.231
A4 = 1.62988e−05,  A6 = 2.95430e−08,  A8 = 7.63951e−11
3rd surface k = 1.455
A4 = −4.72083e−06,  A6 = 1.27902e−07,  A8 = −1.98702e−09
4th surface k = 9.700
A4 = −4.27125e−06,  A6 = −5.99103e−09,  A8 = −1.27825e−09
14th surface k = 10.003
A4 = −3.12715e−05,  A6 = −2.85032e−08,  A8 = 1.85689e−11
15th surface k = −0.243
A4 = 3.14567e−05,  A6 = −8.82386e−08,  A8 = 2.34814e−10

Various data

| Focal length | 17.31 |
| Fno. | 1.72 |
| Angle of field 2ω | 69.79 |
| fb (in air) | 14.26 |
| Lens total length (in air) | 52.18 |
| Image height | 10.82 |

In focus state

Infinity

| d10 | 6.89 |
| d15 | 1.89 |

Magnification is −1/10

| d10 | 6.35 |
| d15 | 2.43 |

Object—Image distance is 200 mm

| d10 | 5.18 |
| d15 | 3.60 |

Unit focal length

| f1 = 30.94 | f2 = 19.60 | f3 = −88.38 |

Aberrations of the lens systems according to the first to eighth examples are shown in FIGS. 5A to 5L through 12A to 12L. In these aberration diagrams, "FIY" represents the largest image height.

Among the aberration diagrams, FIGS. 5A to 5D, 6A to 6D, 7A to 7D, 8A to 8D, 9A to 9D, 10A to 10D, 11A to 11D, and 12A to 12D show spherical aberration (SA), astigmatism (AS), distortion (DT), and chromatic aberration (CC) in the state in which the lens system is focused on an object at infinity.

FIGS. 5E to 5H, 6E to 6H, 7E to 7H, 8E to 8H, 9E to 9H, 10E to 10H, 11E to 11H, and 12E to 12H show spherical aberration (SA), astigmatism (AS), distortion (DT), and chromatic aberration (CC) in the state in which the magnification is −1/10.

FIGS. 5I to 5L, 6I to 6L, 7I to 7L, 8I to 8L, 9I to 9L, 10I to 10L, 11I to 11L, and 12I to 12L show spherical aberration (SA), astigmatism (AS), distortion (DT), and chromatic aberration (CC) in the state in which the distance between the object and the paraxial image plane is 200 mm.

Next, the values of conditional expressions (1) to (5) in each example are shown below.

| Conditional expressions | Example 1 | Example 2 | Example 3 | Example 4 |
| --- | --- | --- | --- | --- |
| (1) $f_1/f$ | 4.08 | 1.87 | 1.86 | 2.71 |
| (2) $f_{23}/f_2$ | 1.12 | 1.21 | 1.21 | 1.19 |
| (3) TL/f | 3.02 | 3.01 | 3.01 | 3.01 |
| (4) $f_{3n}/f$ | −1.12 | −1.07 | −1.09 | −1.01 |
| | −1.88 | | | |
| (5) $f/f_3$ | −0.11 | −0.07 | −0.07 | −0.05 |

| Conditional expressions | Example 5 | Example 6 | Example 7 | Example 8 |
| --- | --- | --- | --- | --- |
| (1) $f_1/f$ | 5.91 | 3.87 | 4.05 | 1.79 |
| (2) $f_{23}/f_2$ | 0.97 | 1.08 | 1.09 | 1.33 |
| (3) TL/f | 3.30 | 3.07 | 3.05 | 3.01 |
| (4) $f_{3n}/f$ | −4.59 | −4.50 | −1.60 | −5.11 |
| (5) $f/f_3$ | 0.05 | −0.10 | −0.08 | −0.20 |

Figure 14:
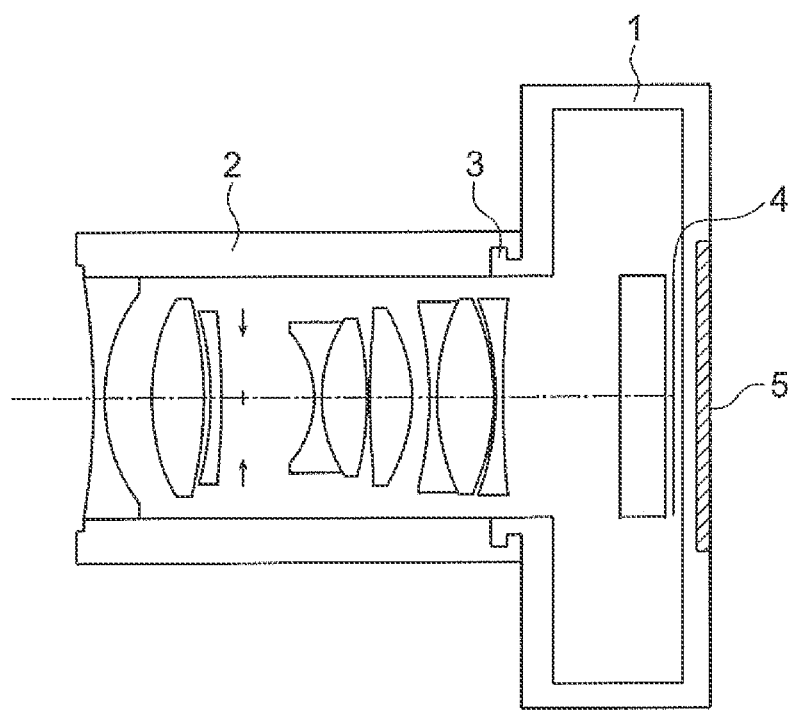
FIG. 14 is a cross sectional view of an interchangeable lens camera that uses an inner focus lens system according to the present invention as an interchangeable lens.

FIG. 14 is a cross sectional view of a single lens mirror-less camera as an electronic image pickup apparatus. FIG. 14 shows the single lens mirror-less camera 1, a taking lens system 2 provided in a lens barrel, a mount portion 3 of the lens barrel with which the taking lens system 2 can be detachably mounted on the single lens mirror-less camera 1. The mount portion 3 may be a screw mount, a bayonet mount or the like. In this illustrative case, a bayonet mount is used. FIG. 14 also shows a surface 4 of an image pickup element and a monitor 5 on the back of the camera. The image pickup element may be a small-size CCD or CMOS sensor.

As the taking lens system 2 of the single lens mirror-less camera 1, an inner focus lens system according to the present invention, for example, according to one of the first to eighth examples is used.

Figure 15:
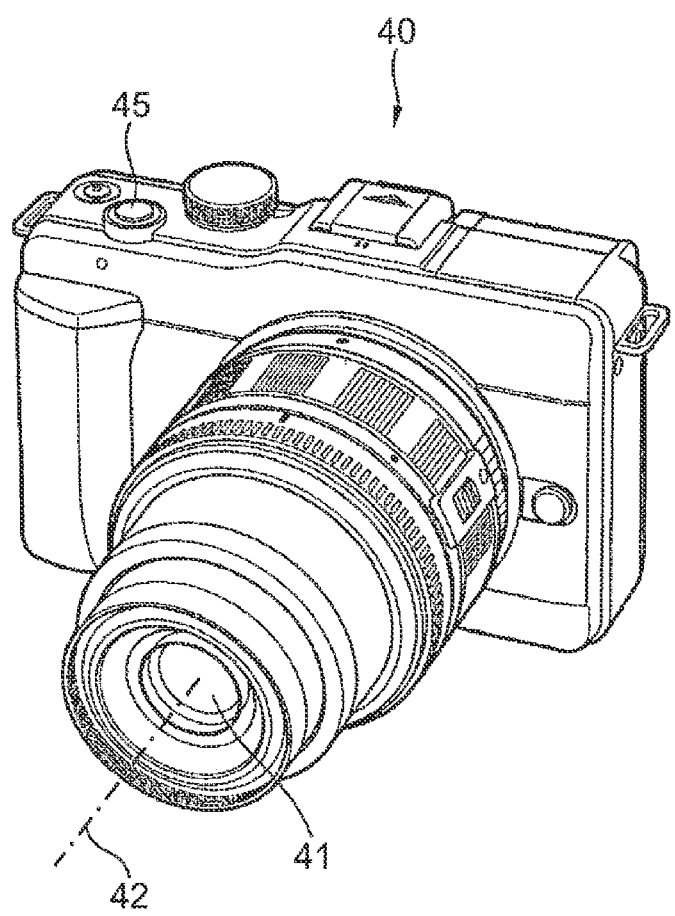
FIG. 15 is a front perspective view of a digital camera according to the present invention.
Figure 16:
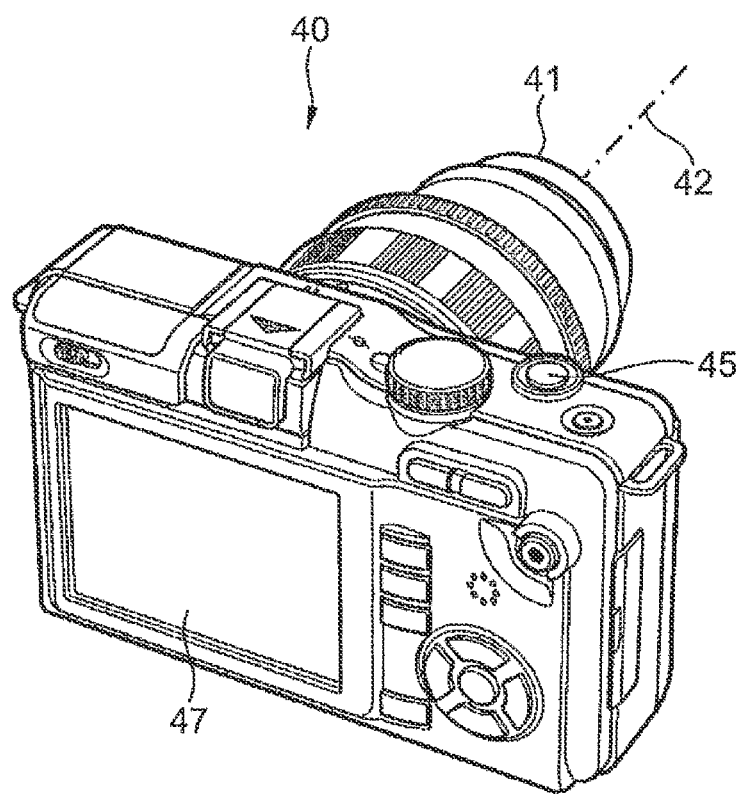
FIG. 16 is a rear perspective view of the digital camera shown in FIG. 15.

FIGS. 15 and 16 schematically show the construction of an image pickup apparatus according to the present invention. FIG. 15 is a front perspective view showing the outer appearance of a digital camera 40 as the image pickup apparatus. FIG. 16 is a rear perspective view of the digital camera 40. In this digital camera 40, an inner focus lens system according to the present invention is used as the taking optical system 41.

The digital camera 40 according to this example has the taking optical system 41 arranged in the taking optical path 42, a shutter release button 45, and a liquid crystal display monitor 47. In response to depression of the shutter release button 45 provided on the top of the camera 40, shooting through the taking optical system 41, e.g. the inner focus lens system according to the first example, is effected. Specifically, an image of an object is formed by the taking optical system 41 on the image pickup element (photoelectric conversion surface) provided in the vicinity of the image plane. The image of the object picked up by the image pickup element is processed by a processing unit and displayed as an electronic image on the liquid crystal display monitor 47 provided on the back of the camera. The picked-up electronic image can be stored in a storage unit.

Figure 17:
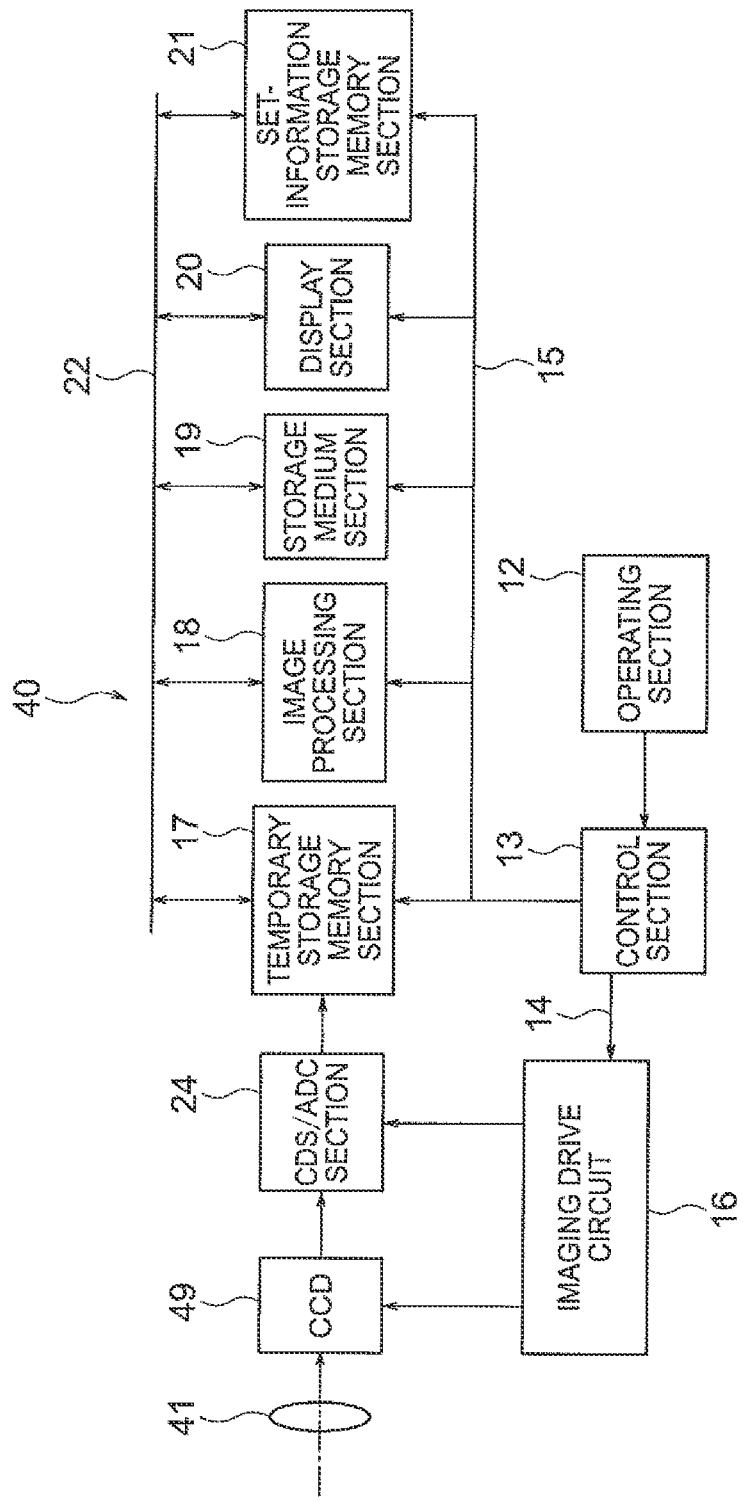
FIG. 17 is a block diagram showing the relevant internal circuit of the digital camera shown in FIG. 15.

FIG. 17 is a block diagram showing the relevant internal circuit of the digital camera 40. In the case described hereinafter, the processing unit described above includes for instance, a CDS/ADC section 24, a temporary storage memory section 17, and an image processing section 18, and the storage unit includes a storage medium section 19 for example.

As shown in FIG. 17, the digital camera 40 has an operating section 12 and a control section 13 connected to the operating section 12. The digital camera 40 also has an imaging drive circuit 16, the temporary storage memory section 17, the image processing section 18, the storage medium section 19, a display section 20, and a set-information storage memory section 21, which are connected to control signal output ports of the control section 13 via buses 14 and 15.

The temporary storage memory section 17, the image processing section 18, the storage medium section 19, the display section 20, and the set-information storage memory section 21 are configured to be capable of mutually inputting and outputting data via a bus 22. Moreover, the CCD 49 and the CDS/ADC section 24 are connected to the imaging drive circuit 16.

The operating section 12 is equipped with various entry buttons and switches and notifies the control section 13 of event information entered through the entry buttons and switches from outside (by a user of the camera). The control section 13 is a central processing device such as a CPU and has a built-in program memory, which is not shown in the drawings. The control section 13 performs overall control of the digital camera 40 according to a program stored in the program memory.

The CCD 49 is an image pickup element that is driven and controlled by the imaging drive circuit 16 to convert the quantity of light of the object image formed through the taking optical system 41 into an electrical signal on a pixel-by-pixel basis and to output it to the CDS/ADC section 24.

The CDS/ADC section 24 is a circuit that amplifies the electrical signals input from the CCD 49, performs analog-to-digital conversion, and outputs to the temporary storage memory section 17 raw image data (or Bayer data, which will be hereinafter referred to as "RAW data") that has undergone only amplification and digital conversion.

The temporary storage memory section 17 may include, for example, an SDRAM and serves as a buffer. The temporary storage memory section 17 is a memory device that temporarily stores the RAW data output from the CDS/ADC section 24. The image processing section 18 is a circuit that reads RAW data stored in the temporary storage memory section 17 or RAW data stored in the storage medium section 19 and performs various electrical image processing including distortion correction based on image quality parameters specified by the control section 13.

The storage medium section 19 allows a detachable mounting of a recording medium such as, for example, a card-type or stick-type flash memory. The storage medium section 19 records or writes RAW data transferred from the temporary storage memory section 17 and image data having been processed in the image processing section 18 in the flash memory to have the data stored in it.

The display section 20 includes the liquid-crystal display monitor 47 and displays picked-up RAW data, image data, and operation menu etc. The set-information storage memory section 21 includes a ROM section in which various image quality parameters are stored in advance and a RAM section for storing image quality parameters read from the ROM section in response to an entry(ies) made through the operating section 12.

The digital camera 40 having the above-described construction uses as the taking optical system 41 an inner focus lens system according to the present invention. Thus, the digital camera 40 can be an image pickup apparatus that is advantageous in producing high resolution images without deterioration in image quality, while having a wide angle of view and being small in size.S As described above, the inner focus lens system and the image pickup apparatus according to the present invention are useful when high resolution images of a wide area are to be obtained without deterioration in image quality.

What is claimed is:

1. An inner focus lens system comprising, in order from an object side to an image side:
    a first lens unit having a positive refractive power;
    an aperture stop;
    a second lens unit having a positive refractive power; and
    a third lens unit, wherein
    the total number of lens units in the inner focus lens system is three, the three lens units including the first lens unit, the second lens unit, and the third lens unit,
    the first lens unit comprises a plurality of negative lenses and at least one positive lens, the lens located closest to the object side in the first lens unit being one negative lens among the plurality of negative lenses,
    the second lens unit includes at least one negative lens and at least one positive lens,
    for focusing from an infinite object distance to a close object distance, the second lens unit moves toward the object side in such a way that the distance between the second lens unit and the aperture stop decreases and that the distance between the second lens unit and the third lens unit increases, and the lens system satisfies the following conditional expressions (1) and (2):

$$1 < f_1/f < 14 \quad (1),$$

and $$0.8 < f_{23}/f_2 < 3 \quad (2),$$

where
    $f_1$ is the focal length of the first lens unit,
    f is the focal length of the entire inner focus lens system in the state in which the inner focus lens system is focused on an object point at infinity,
    $f_{23}$ is the composite focal length of the second lens unit and the third lens unit in the state in which the lens system is focused on an object at infinity, and
    $f_2$ is the focal length of the second lens unit.

2. The inner focus lens system according to claim 1, wherein the first lens unit comprises at least four lenses.

3. The inner focus lens system according to claim 1, wherein the inner focus lens system satisfies the following conditional expression (3):

$$2 < TL/f < 4 \quad (3),$$

where TL is the sum of the distance on the optical axis from the lens surface closest to the object side to the lens surface closest to the image side of the inner focus lens system and a back focus,
    f is the focal length of the entire inner focus lens system in the state in which the inner focus lens system is focused on an object at infinity.

4. The inner focus lens system according to claim 1, wherein the inner focus lens system satisfies the following conditional expression (2'):

$$1 < f_{23}/f_2 < 3 \quad (2'),$$

where $f_{23}$ is the composite focal length of the second lens unit and the third lens unit in the state in which the lens system is focused on an object at infinity, and
    $f_2$ is the focal length of the second lens unit.

5. The inner focus lens system according to claim 1, wherein the first lens unit comprises a cemented lens made up of a negative lens and a positive lens cemented together arranged closer to the image side than the negative lens closest to the object side, and the first lens unit comprises four lenses.

6. The inner focus lens system according to claim 1, wherein the second lens unit comprises, in order from the object side, a negative lens, a positive lens, and a positive lens, and the total number of lenses in the second lens unit is three.

7. The inner focus lens system according to claim 1, wherein the third lens unit comprises at least one negative lens.

8. The inner focus lens system according to claim 1, wherein the third lens unit comprises at least one positive lens and at least one negative lens.

9. The inner focus lens system according to claim 7, wherein at least one negative lens in the third lens unit satisfies the following conditional expression (4):

$$-50 < f_{3n}/f < -0.5 \qquad (4),$$

where $f_{3n}$ is the focal length of at least one negative lens in the third lens unit, and f is the focal length of the entire inner focus lens system in the state in which the inner focus lens system is focused on an object point at infinity.

10. The inner focus lens system according to claim 1, wherein the third lens unit has a positive refractive power.

11. The inner focus lens system according to claim 1, wherein the third lens unit has a negative refractive power.

12. The inner focus lens system according to claim 11, wherein the third lens unit consists of a single lens having a negative refractive power.

13. The inner focus lens system according to claim 1, wherein the F-number of the inner focus lens system is equal to or less than 2, and the half angle of view of rays that pass the center of the aperture stop and incident on highest image height positions is larger than 30 degrees.

14. The inner focus lens system according to claim 1, wherein the inner focus lens system satisfies the following conditional expression (5):

$$-1 < f/f_3 < 0.5 \qquad (5),$$

where $f_3$ is the focal length of the third lens unit, and f is the focal length of the entire inner focus lens system in the state in which the inner focus lens system is focused on an object point at infinity.

15. The inner focus lens system according to claim 1, wherein the positions of the first lens unit and the third lens unit are fixed during focusing from an infinite object distance to a close object distance.

16. An image pickup apparatus comprising:
an inner focus lens system according to claim 1; and
an image pickup element that is disposed on the image side of the inner focus lens system and converts an image formed by the inner focus lens system into an electrical signal.

* * * * *